(12) United States Patent
Omelyanchuk et al.

(10) Patent No.: US 8,370,838 B1
(45) Date of Patent: *Feb. 5, 2013

(54) SYSTEM AND METHOD FOR STARTING A CLOUD-BASED VIRTUALIZATION SYSTEM WITH PARTIALLY DEPRIVILEGED HOST OS

(75) Inventors: Andrey A. Omelyanchuk, Moscow (RU); Alexander G. Tormasov, Moscow (RU); Nikolay N. Dobrovolsiy, Moscow (RU); Alexey B. Koryakin, Moscow (RU); Stanislav S. Protassov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 303 days.

This patent is subject to a terminal disclaimer.

(21) Appl. No.: 12/980,841

(22) Filed: Dec. 29, 2010

Related U.S. Application Data

(63) Continuation of application No. 11/348,382, filed on Feb. 7, 2006, now Pat. No. 7,865,893.

(60) Provisional application No. 60/650,135, filed on Feb. 7, 2005.

(51) Int. Cl.
*G06F 9/455* (2006.01)
*G06F 15/16* (2006.01)

(52) U.S. Cl. ............................................ 718/1; 709/201

(58) Field of Classification Search ........................ None
See application file for complete search history.

(56) References Cited

U.S. PATENT DOCUMENTS

| | | | |
|---|---|---|---|
| 4,253,145 A | 2/1981 | Goldberg | |
| 5,038,281 A | 8/1991 | Peters | |
| 6,397,242 B1 | 5/2002 | Devine et al. | |
| 6,496,847 B1 | 12/2002 | Bugnion et al. | |
| 6,530,078 B1 | 3/2003 | Shmid et al. | |
| 6,704,925 B1 | 3/2004 | Bugnion | |
| 6,711,672 B1 | 3/2004 | Agesen | |
| 6,725,289 B1 | 4/2004 | Waldspurger et al. | |
| 6,735,601 B1 | 5/2004 | Subrahmanyam | |
| 6,785,886 B1 | 8/2004 | Lim et al. | |
| 6,789,156 B1 | 9/2004 | Waldspurger et al. | |
| 6,795,966 B1 | 9/2004 | Lim et al. | |
| 6,880,022 B1 | 4/2005 | Waldspurger et al. | |
| 6,944,699 B1 | 9/2005 | Bugnion et al. | |
| 6,961,806 B1 | 11/2005 | Agesen et al. | |
| 6,961,941 B1 | 11/2005 | Nelson et al. | |
| 7,383,327 B1 * | 6/2008 | Tormasov et al. | ............ 709/220 |
| 7,577,722 B1 | 8/2009 | Khandekar et al. | |
| 2005/0132365 A1 | 6/2005 | Madukkarumukumana et al. | |
| 2005/0246453 A1 | 11/2005 | Erlingsson et al. | |
| 2009/0187698 A1 * | 7/2009 | Serebrin | ........................ 711/6 |

OTHER PUBLICATIONS

Barham, P., et al., "Xen and the Art of Visualization," University of Cambridge Computer Laboratory, Cambridge UK, pp. 1-14 (2003).
Fraser, K., et al., "Reconstructing I/O," University of Cambridge, Technical Report 596:1-16 (2004).

* cited by examiner

*Primary Examiner* — Kenneth Tang
(74) *Attorney, Agent, or Firm* — Bardmesser Law Group

(57) ABSTRACT

A computing cloud comprising at least one computing node having a Virtual Machine (VM) running on a user level. A plurality of additional computing nodes, each node having a Hypervisor with the highest privilege level, a Virtual Machine Monitor (VMM) running with no higher privileges than the Hypervisor, and a plurality of Virtual Machines (VMs) running on a user level. Each node has a Primary operating system (POS) running within the one of its VMs. The POS has direct access to hardware devices of the corresponding computing node. The other VMs use the corresponding POS of its node to access the hardware devices.

20 Claims, 20 Drawing Sheets

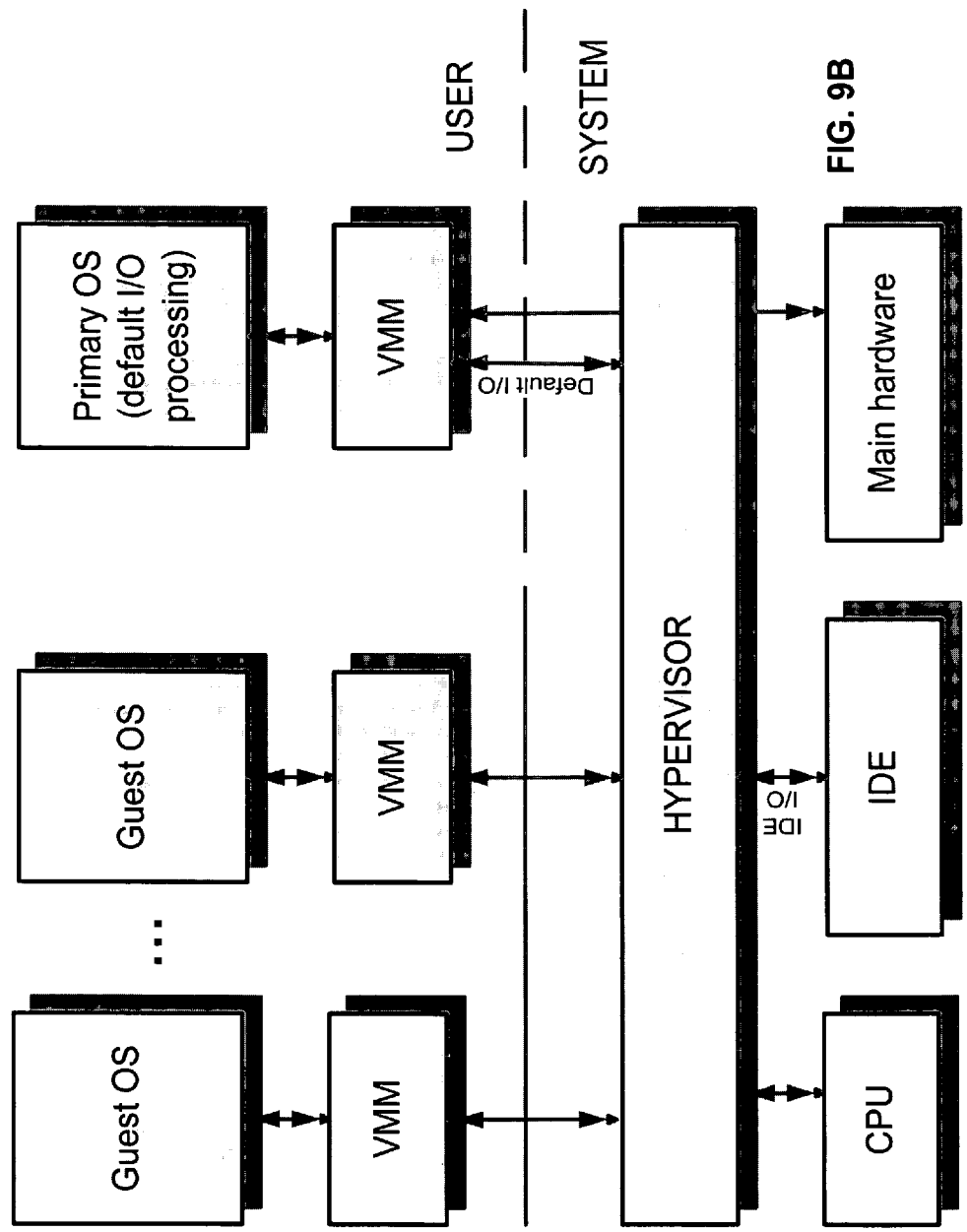

SYSTEM AND METHOD FOR STARTING A CLOUD-BASED VIRTUALIZATION SYSTEM WITH PARTIALLY DEPRIVILEGED HOST OS

CROSS-REFERENCE TO RELATED APPLICATIONS

This application is a continuation of U.S. patent application Ser. No. 11/348,382, filed Feb. 7, 2006 now U.S. Pat. No. 7,865,893, entitled SYSTEM AND METHOD FOR STARTING VIRTUAL MACHINE MONITOR IN COMMON WITH ALREADY INSTALLED HOST OPERATING SYSTEM, which is a non-provisional of U.S. Provisional Patent Application No. 60/650,135, filed on Feb. 7, 2005, entitled SYSTEM AND METHOD FOR STARTING VIRTUAL MACHINE MONITOR IN COMMON WITH ALREADY INSTALLED HOST OPERATING SYSTEM, which is incorporated by reference herein in its entirety.

BACKGROUND OF THE INVENTION

1. Field of the Invention

The present invention relates to Virtual Machine technology.

2. Background Art

With Virtual Machine (VM) technology, a user can create and run multiple operating environments on a server at the same time. Each operating environment, or Virtual Machine, requires its own operating system (OS) and can run applications independently. The VM software provides a layer between the computing, storage, and networking hardware and the software that runs on it.

Virtual Machine technology can lower information technology (IT) cost through increased efficiency, flexibility, and responsiveness. Each VM acts as a separate environment, which reduces risk and allows developers to quickly re-create different operating system (OS) configurations or compare versions of applications designed for different OS's. Additional customer uses for VMs include targeted production server consolidation, hosting of legacy applications (older versions), and computer or server backup.

A Virtual Machine technology is therefore one technique for emulating or otherwise virtualizing the behavior of software and/or hardware. Generally, a Virtual Machine is an environment that is launched on a particular processor that is running an operating system. Normally, the operating system installed on such a machine or processor has certain privileges that are not available to user applications. For example, many input/output commands may be privileged, and executable only in the operating system (or privileged) mode. Certain areas of memory, or certain addresses in memory, also may require operating system privilege to be accessed.

A frequent situation that arises in this context is the problem of emulating (or, more broadly, virtualizing) a different operating system on the same processor. For example, with one version of Microsoft Windows running on the Intel x86 processor (for example, in a server environment), it may be necessary to emulate the behavior of another (different) version of Windows on the same Intel processor. This second operating system is generally referred to as "Guest OS," and the code that it executes is generally referred to as "guest code." Note that in order for the emulation to be meaningful, the Guest OS needs to execute privileged instructions as if it were actually running on the processor. In other words, the Guest OS, running as a Virtual Machine, is itself unaware that it is a Virtual Machine.

Execution of such privileged instructions, however, is the province of the native operating system. Therefore, any attempts by the Guest OS inside Virtual Machine to execute privileged instructions must be intercepted, so that they can be properly executed (or otherwise handled) by the VMM. The component that is responsible for this interception and emulation of privileged instructions is called a "Virtual Machine Monitor" or "VMM."

A typical Virtual Machine Monitor (VMM) enables a single physical machine or processor to act as if it were several physical machines. A typical VMM, under control of a high-ranking operating system (OS), can run a number of different operating systems simultaneously, such that each of these different operating systems is its own Virtual Machine.

In other words, the Virtual Machine Monitor can handle one or a number of Virtual Machines, each of which represents its own operating system, and each of which can run its own application software. Usually, in industry parlance, the high-ranking OS is referred to as a "host OS" (HOS). The multiple operating systems that are running as Virtual Machines are usually referred to as "guest operating systems" ("Guest OS's") running "guest code." At the present time, there are two conventional mechanisms for structuring VMMs: a non-hosted VMM, and a hosted VMM.

In the case of the non-hosted VMM, which is shown in FIG. 1, the VMM itself is a full-fledged operating system. Such a non-hosted VMM includes drivers for controlling and managing input/output activities of the physical computer. The non-hosted VMM is installed onto a "bare" PC, and has a monopoly on control over the I/O devices. This type of VMM exists at the system level, and can create any number of Virtual Machines that do not exist at the system level, and which cannot directly work with input/output devices. Such a VMM, therefore, needs to manage CPU scheduling and resource sharing for the Virtual Machines. An example of such a VMM is the IBM ESA/390.

The non-hosted VMM have several problems. One problem is complexity. Apart from virtualization, it must also manage I/O device handling, memory handling, scheduling and so on. Such a VMM therefore needs to be designed as a full-fledged operating system with additional virtualization support. Another problem is poor compatibility. Due to a very large spectrum of available hardware and I/O devices, it is almost impossible to support all possible PC configurations for such a VMM. Therefore, such a VMM is usually limited to supporting a small set of possible (predefined) hardware configurations. In any event, a non-hosted VMM cannot normally work directly with all the I/O hardware. An additional problem is a large footprint and having to include third-party code (device drivers, and so on) that run on the system level—this can seriously affect overall system stability and security.

In the case of the hosted VMM, which is shown in FIG. 2, the VMM itself is not a full-fledged operating system. Such a VMM does not include device drivers, and cannot control hardware devices, such as I/O devices, directly. Such a hosted VMM is installed into the host operating system (HOS), and uses HOS's API (application programming interface) to work with the I/O devices. Both the VMM and the host operating system have system-level privileges, and exist on a physical computer concurrently. The VMM is responsible for preserving the context of the host operating system when switching from the HOS to the VMM, and is responsible for restoring the context of the HOS when switching back to the HOS. The hosted VMM creates any number of Virtual Machines, none of which have system-level privileges, and none of which can work with I/O devices directly. The VMM either emulates the input/output devices for the Virtual Machines, and uses the HOS to work with the real I/O devices.

For each VM, a separate process is created, and the HOS is responsible for scheduling of both the VMs and other processes in the HOS. Examples of such hosted VMMs include VMware GSX Server, VMware Workstation, MS Virtual PC, MS Virtual Server and SVISTA 2004.

Hosted VMM also have a number of problems. One such problem is poor security. A non-hosted VMM is well protected, because all its VMs run without system privilege level and cannot harm the VMM and any other VM. If one of the VMs were to crash, it will not affect the VMM nor any other VMs. For the hosted VMM, a crash of the HOS can damage both the VMM and all other VMs. Also, it can be inefficient or even impossible for hosted VMM to use hardware virtualization technologies in new families of processors, such as, for example, Intel's Virtual Machine Extension (VMX) technology.

Accordingly, what is needed is a way to combine the best features of non-hosted VMMs and hosted VMMs to support an efficient virtualization.

BRIEF SUMMARY OF THE INVENTION

The present invention is directed to a system and method for starting a Virtual Machine Monitor in common with an already installed operating system that substantially obviates one or more of the problems and disadvantages of the related art.

There is provided a computer system including a Virtual Machine Monitor (VMM) running with system level privileges. A primary Virtual Machine (VM) is running without system level privileges and has a host operating system (HOS) running within it. A secondary Virtual Machine is running without system level privileges. The HOS has direct access to at least some I/O devices. The VMM can use the HOS to access the at least some I/O devices. The HOS can be installed as the computer system's operating system prior to installation of the VMM. A plurality of secondary Virtual Machines can be running without system level privileges.

In another aspect, a computer system includes a Virtual Machine Monitor (VMM) running with system level privileges; a primary Virtual Machine (VM) without system level privileges and having a host operating system (HOS) running within it; and a secondary Virtual Machine running without system level privileges. The VMM uses the HOS to access at least some I/O devices.

In another aspect, a method of virtualizing a computer system includes, on the computer system having a host operating system (HOS) with system privileges, installing a Virtual Machine Monitor (VMM) as a user application; creating a primary Virtual Machine (VM); transferring the HOS to the primary VM; giving the VMM system privileges; and launching a secondary VM without system privileges. The VMM can use the HOS to access at least some I/O devices after the HOS has been transferred. The transfer of the HOS is conducted during run time, using a reboot, or by reinstalling the HOS inside the primary VM.

In another aspect, a method of virtualizing a bare computer system includes installing a Virtual Machine Monitor (VMM) with system privileges on the bare computer system; creating a primary Virtual Machine (VM); transferring the HOS to the primary VM; and restarting a host operating system (HOS) in the primary VM. A secondary VM can then be launched without system privileges.

In another aspect, a method of virtualizing a bare computer system includes installing a Virtual Machine Monitor (VMM) with system privileges on the bare computer system; creating a primary Virtual Machine (VM); and installing a host operating system (HOS) in the primary VM. A secondary VM can then be launched without system privileges.

In another aspect, a computer system includes a hardware processor having a Virtual Machine treatment mode and a hardware memory being accessed by the hardware processor. A Virtual Machine Monitor (VMM) is running on the processor in the Virtual Machine treatment mode. A primary Virtual Machine (VM) is running as a user application and having a host operating system (HOS) running within it. A secondary Virtual Machine is running as a user application, In another aspect, a virtualization system is provided for a computer that has a host processor, physical system devices, and a host operating system (HOS), and wherein the computer is operationally divided into a system level and a user level. The virtualization system includes at least one Virtual Machine monitor (VMM) at the system level; and a primary Virtual Machine (VM) operatively connected with the VMM, wherein the HOS is at the user level running inside primary VM. The primary VM and the HOS have direct access to some of the physical system devices. The VMM accesses the physical system devices via the primary VM and the HOS.

In another aspect, a computer system includes a Hypervisor having the highest privilege level; a Primary Virtual Machine Monitor (VMM) running with the same or fewer privileges than the Hypervisor; and a Primary Virtual Machine (PVM) without system level privileges and having a Primary operating system (POS) running within it. The POS can be the same operating system that ran on the computer system prior to activation of the Hypervisor. The POS can have hardware drivers used by other components for accessing hardware through the POS. The Hypervisor can have hardware drivers used by other components for accessing hardware through the Hypervisor. Alternatively, the POS can have some hardware drivers used by other components for accessing hardware, and the Hypervisor can have other hardware drivers used by the other components for accessing other hardware through the Hypervisor. The POS can have direct access to at least some real hardware devices.

The system can optionally include at least one additional VMM controlling at least one additional VM; and at least one Guest OS running within the additional VM. The Guest OS can work with virtualized hardware, and hardware access requests from the Guest OS or its VMM are translated by the Hypervisor to real hardware using the POS.

Here, real hardware includes shareable hardware and non-shareable hardware. Shareable hardware can accessed by many Guest OSs and POS, and non-shareable hardware is accessed only by the single Guest OS or single POS. The Hypervisor can also convert hardware access requests from the Guest OS into real hardware access requests. The Hypervisor can also restrict an ability of any VMM to write to an Interrupt Descriptor Table.

In another aspect, a computer cluster includes a plurality of computing nodes, each node having a Hypervisor with the highest privilege level, and a Virtual Machine Monitor (VMM) running with same or fewer privileges than the Hypervisor, and a Virtual Machine (VM) running on a user level. Each node also has at least one of (a) a Primary operating system (POS) running within the corresponding VM and (b) a Guest operating system (GOS) running within the corresponding VM. The POS can be the same operating system that ran on the computer system prior to activation of the Hypervisor. The POS can be migrated from one node to another. The migration can involve upgrading a Guest OS to a Primary OS.

In another aspect, a computer system includes a Hypervisor having the highest privilege level; a plurality of Virtual Machine Monitors (VMMs) running with the same or fewer privileges than the Hypervisor; and a plurality of Virtual Machines (VMs) without system level privileges and each having a Primary operating system (POS) running within it. Each POS can be the same operating system that ran on the computer system prior to activation of the Hypervisor but having direct access to a subset of physical hardware devices of the computer system. Additional Virtual Machines each running a Guest Operating System can have access only to virtualized hardware. Additional Virtual Machines each running a Guest Operating System can have access only to virtualized hardware and to non-shareable hardware.

In another aspect, a method of virtualization on a computer system having an operating system, the method including initiating a Hypervisor having the highest privilege level; initiating a Primary Virtual Machine Monitor (VMM) running with the same or fewer privileges than the Hypervisor; initiating a Virtual Machine (VM) without system level privileges, the VMM controlling the VM; and migrating the operating system inside the VM. Other Virtual Machines having Guest Operating Systems running therein can be initiated, the Guest Operating Systems working with virtualized hardware, wherein the Hypervisor routes hardware access requests to the operating system inside the VM.

In another aspect, a method of computer system crash recovery on a computer system having an operating system, the method including initiating a Hypervisor having the highest privilege level; initiating a plurality of Virtual Machine Monitors (VMMs) running with some system level privileges but with fewer privileges than the Hypervisor; initiating a Virtual Machine (VM) without system level privileges corresponding to each VMM; migrating the operating system inside one of the VMs and activating it as a Primary OS; maintaining at least one quiescent Primary OS inside one of the other VMs; upon failure of the Primary OS, upgrading the quiescent Primary OS to active Primary OS.

In another aspect, a method of computer system crash recovery on a computer system having an operating system, the method comprising initiating a Hypervisor having the highest privilege level; initiating a plurality of Virtual Machine Monitors (VMMs) running with some system level privileges but with fewer or same privileges than the Hypervisor; initiating a Virtual Machine (VM) on the user level corresponding to each VMM; migrating the operating system inside one of the VMs and activating it as a Primary OS; initiating Guest OS's inside the other VMs; and upon failure of the Primary OS, upgrading one of the Guest OS's to Primary OS.

A method of computer system crash recovery on a computer system having an operating system, including initiating a Hypervisor having the highest privilege level; initiating a plurality of Virtual Machine Monitors (VMMs) running with the same or fewer privileges as the Hypervisor; initiating a Virtual Machine (VM) on the user level corresponding to each VMM, and reserving at least one of the VMs and an operating system within it as a reserved Primary VM and a reserved Primary OS; and, upon failure of the Primary OS, activating the reserved Primary OS having the same privileges and the failed Primary OS.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9B shows Hypervisor controlling IDE disks directly and Primary OS controlling the rest of the hardware.

Figure 10:
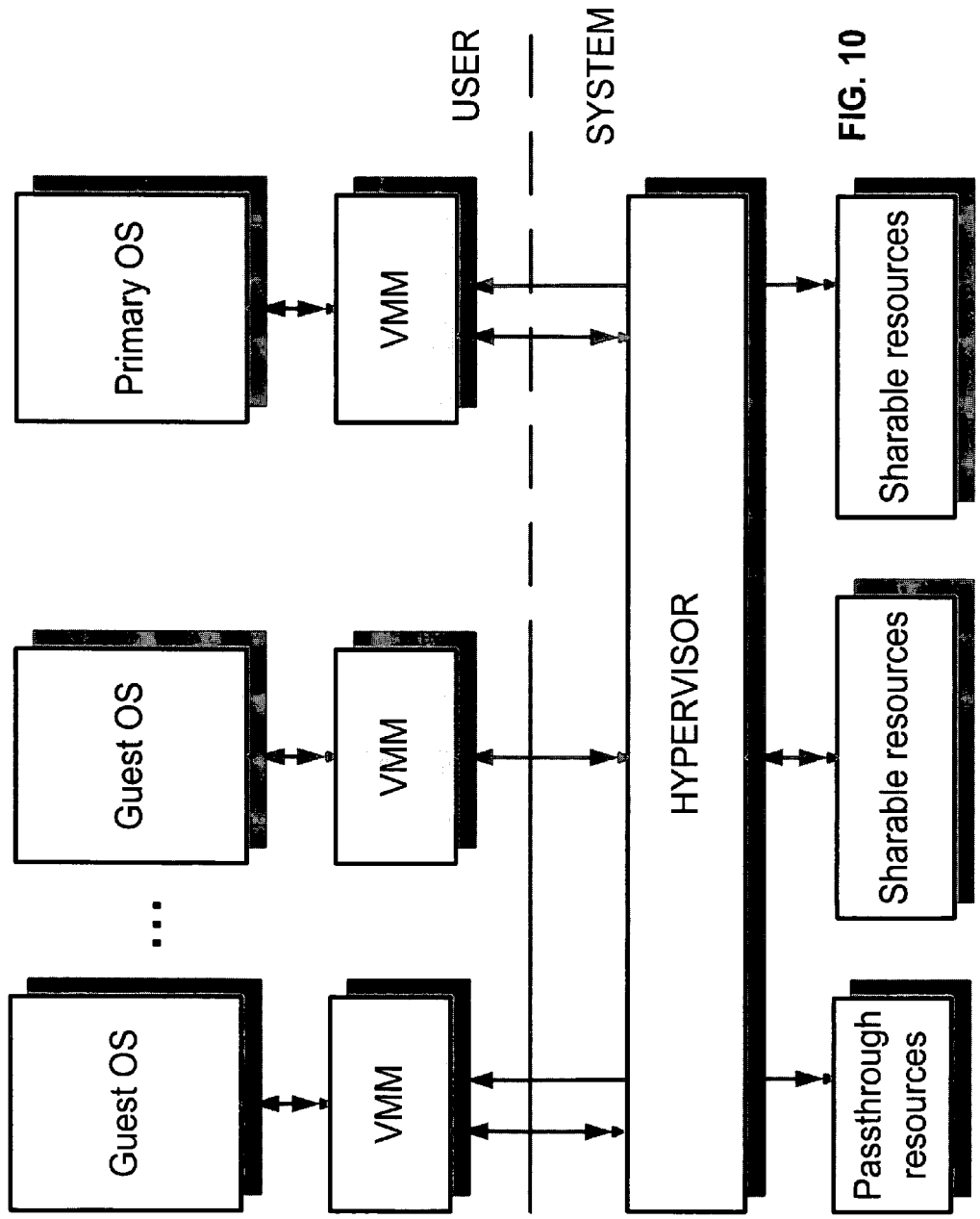

FIG. 10. shows how the system's hardware can be divided into three groups, 1) Controlled exclusively by Guest OS 2) Controlled by the Hypervisor, shared between VMs 3) Controlled by the Primary OS, shared between VMs.

Figure 11:
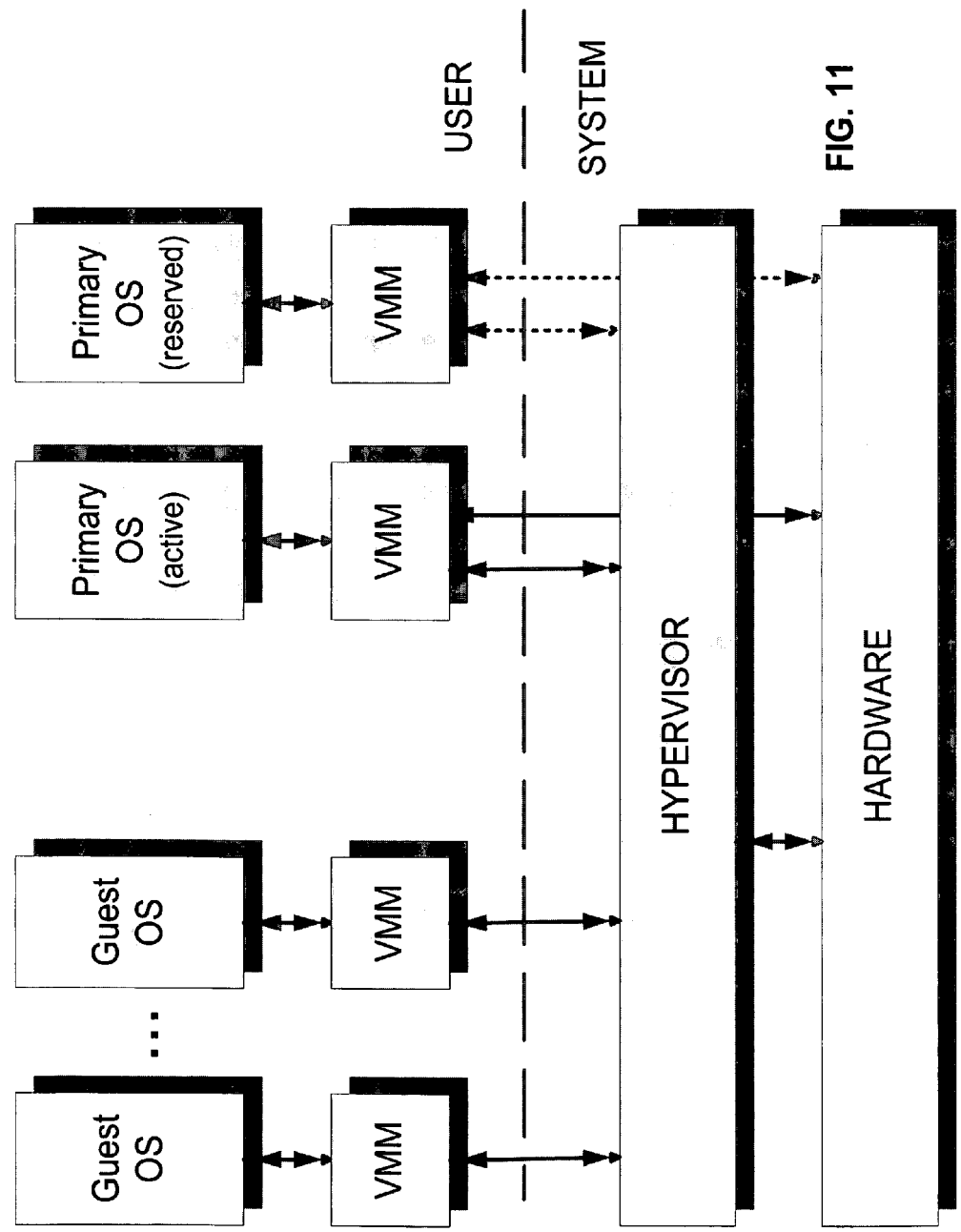

FIG. 11 shows how the Hypervisor can keep one or more Primary OSs "in reserve," until activation due to failure of the main Primary OS.

Figure 12:
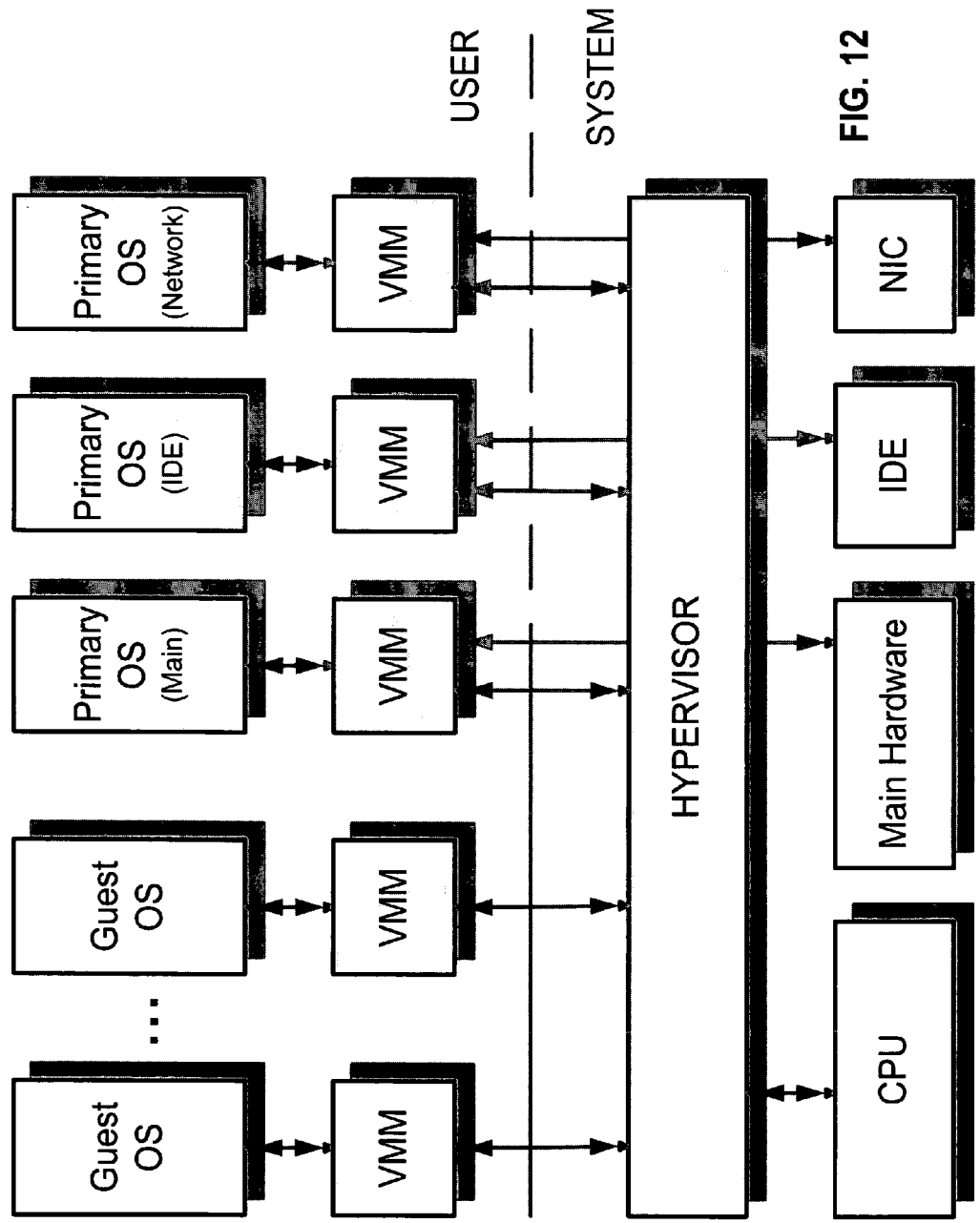

FIG. 12 shows how the Hypervisor can launch several Primary operating systems, such that each of the Primary operating systems is only allowed direct access to one particular hardware device, but no others.

Figure 13:
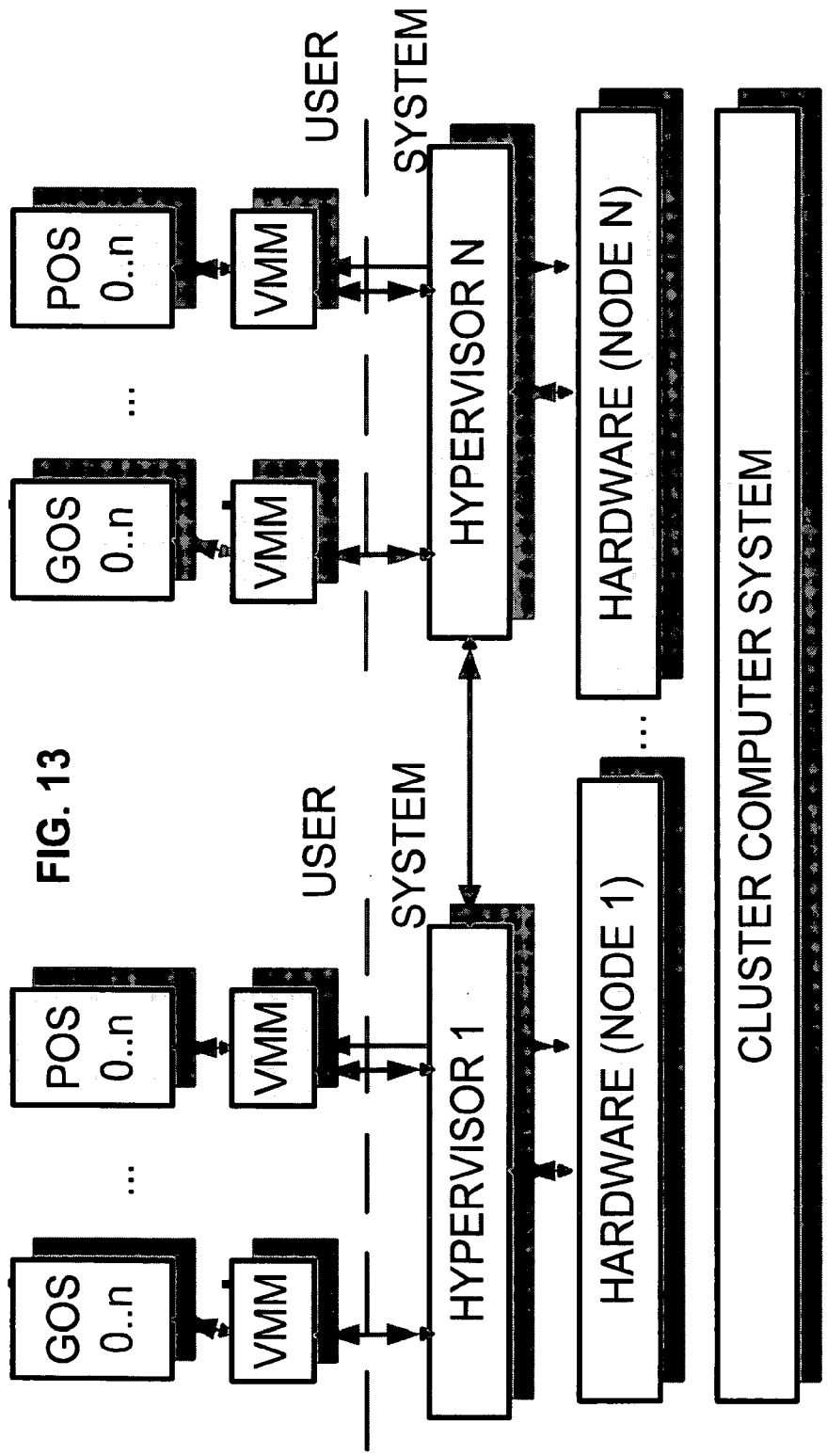

FIG. 13 shows how the Hypervisor concept can be applied to an environment with multiple computers, for example, a computer cluster, a server farm, etc.

Figure 14:
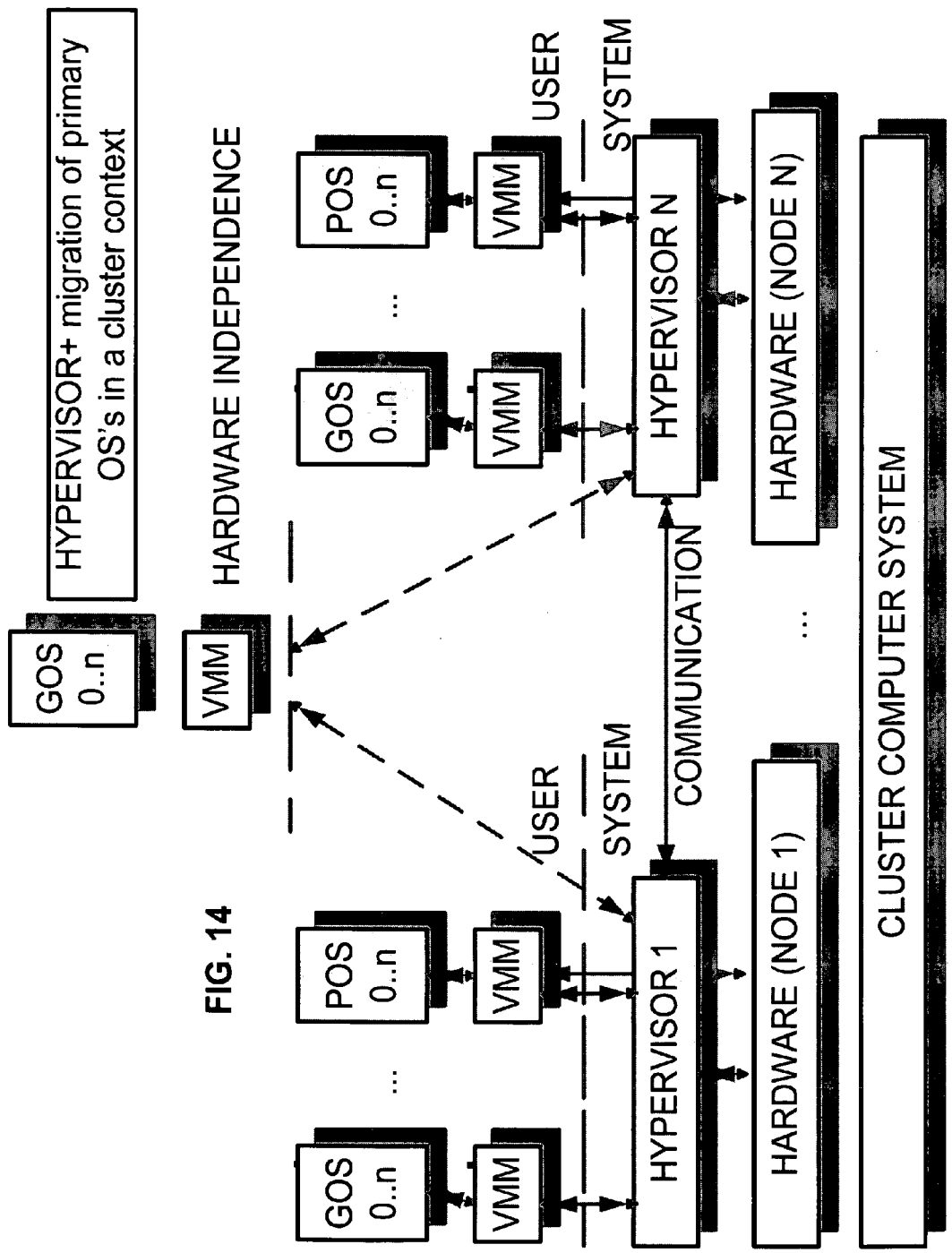
Figure 15:
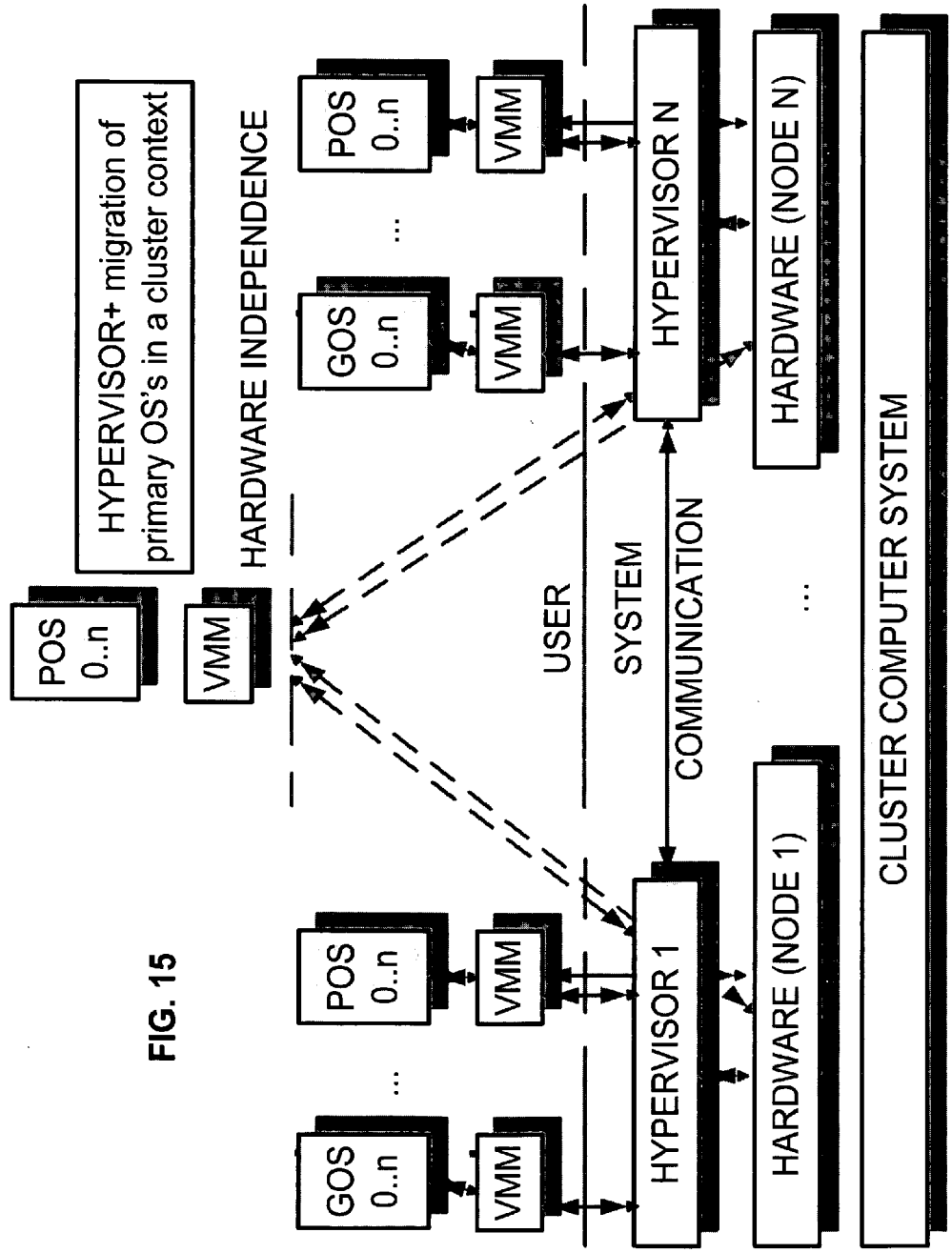

FIG. 14 and FIG. 15 show how the Hypervisor can manage load among the various elements of the cluster.

Figure 16:
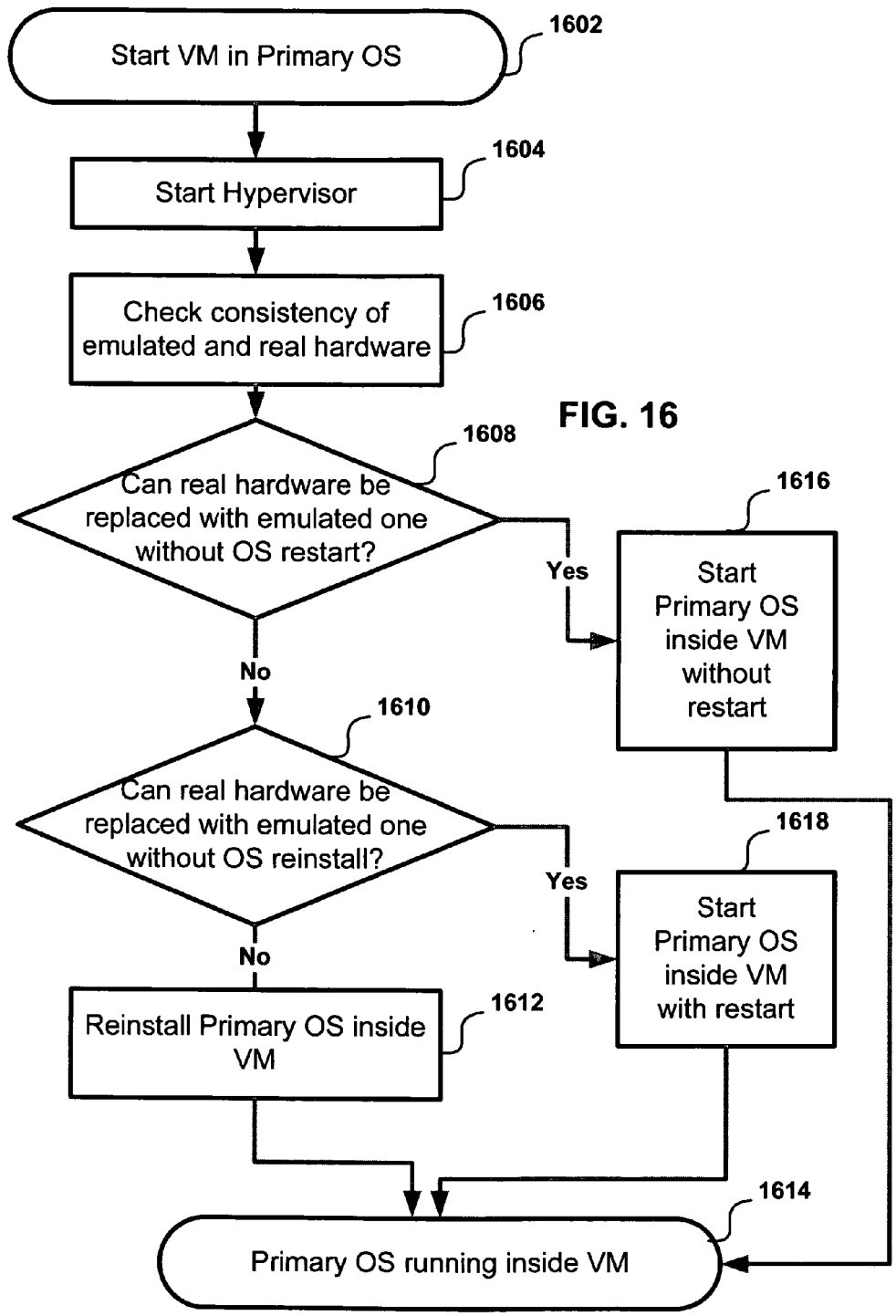

FIG. 16 illustrates the process of launching the Hypervisor according to one embodiment of the invention.

Figure 17:
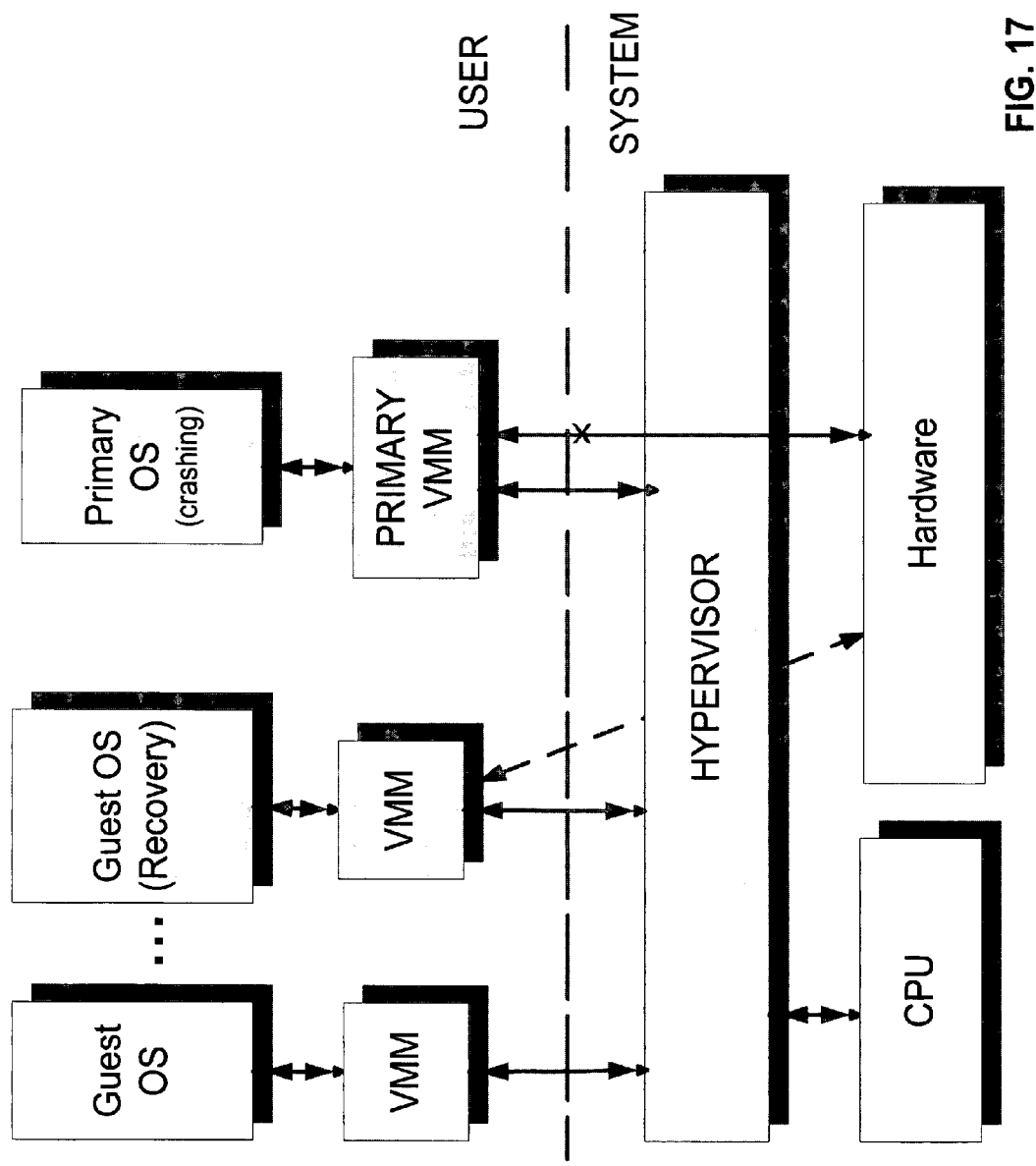

FIG. 17 illustrates the situation where the Primary OS has crashed, and one of the Guest OS's needs to be upgraded to become the Primary OS.

Figure 18:
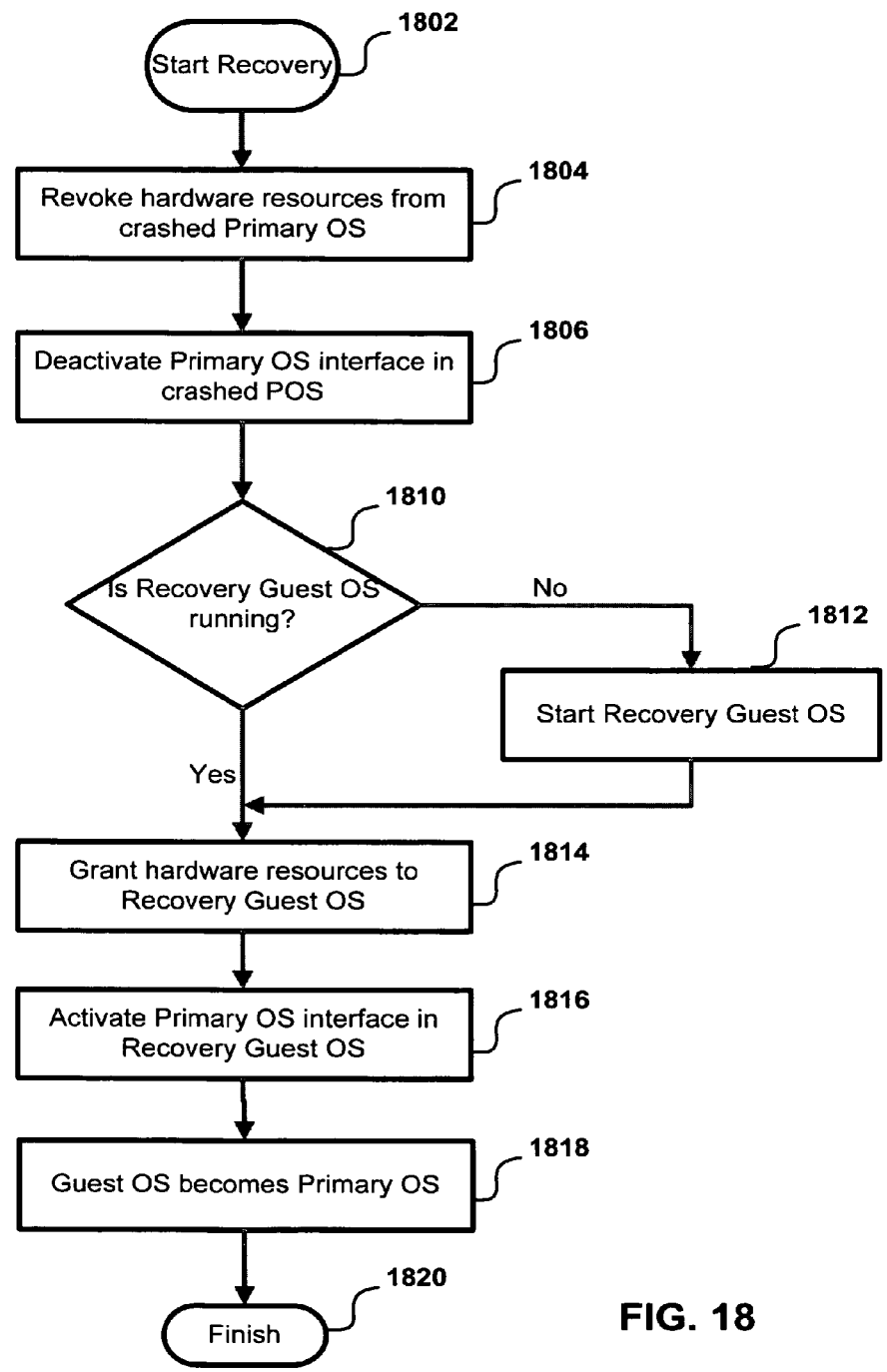

FIG. 18 illustrates the process of recovery from a crash.

Figure 19:
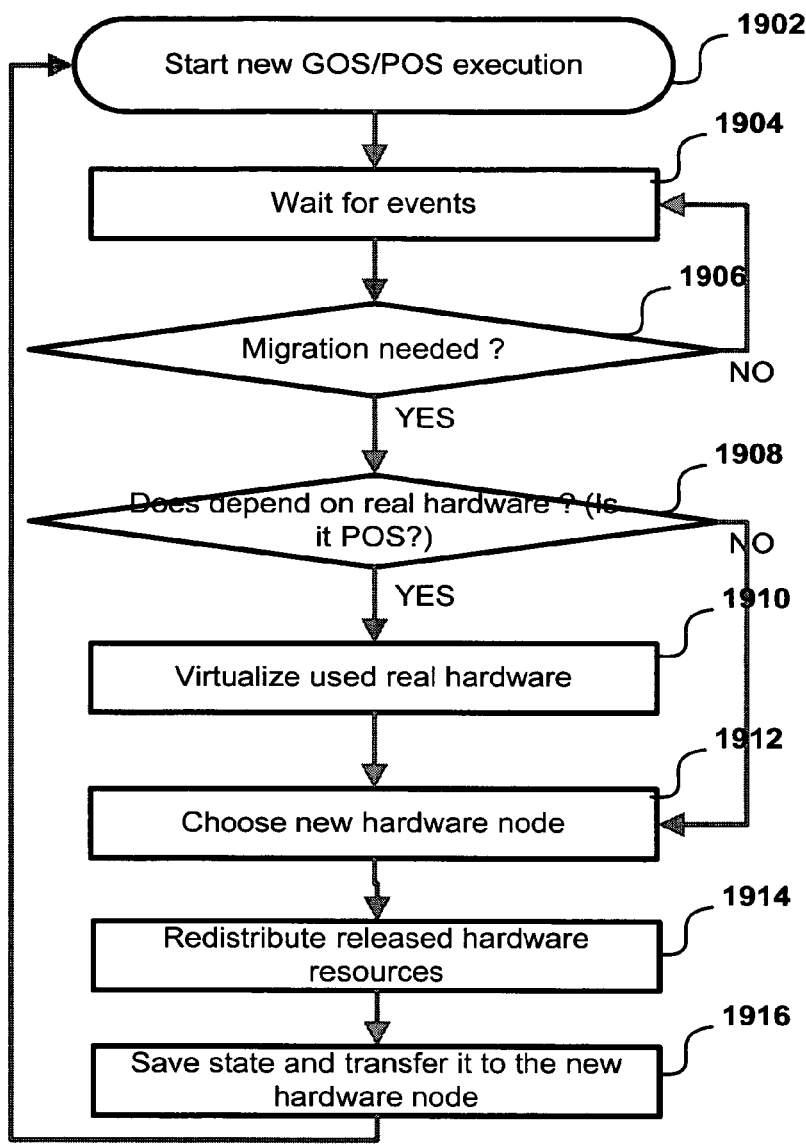

FIG. 19 illustrates the process of migration of one of the operating systems in a cluster context.

DETAILED DESCRIPTION OF THE INVENTION

Reference will now be made in detail to the embodiments of the present invention, examples of which are illustrated in the accompanying drawings.

The VMM, as described herein, is well protected, because the HOS and all the Guest OS's run without system-level privileges and cannot damage the VMM or other VMs. The VMM, as described herein, is flexible and compatible, because all communication with the actual hardware will be done by means of HOS API. Such a VMM is naturally compatible with new hardware virtualization technologies, such as Intel VT and AMD Pacifica technology (and others), and can use them efficiently.

The approach described herein has other advantages. Compared to the non-hosted VMM approach, there is no need to develop the VMM as a full-fledged operating system, which has to support the entire spectrum of the physical devices that may be connected as I/O devices. Furthermore, it is possible to install the VMM described herein on top of the existing operating system, and use it as a standard application, since the VMM, in the present approach, can stay "to the side" of the HOS. In other words, one HOS can be "killed" and a new one created to support I/O functions. Thus, the level of security can be increased.

Compared to the hosted VMM approach, the approach described herein—in the case of using a hardware-based virtualization technology in the processor, the present approach allows the use of the built-in capabilities for switching between the HOS, the VMM, and the various VMs. In this case, the concept of a fully secure VMM can be realized. If, in the conventional hosted VMM, the VMM is protected only from the Guest OS, but can be damaged from the HOS (because from the point of view of the Guest OS, a VMM crash means a crash of all its VMs), here, the Guest OS cannot be damaged by a crash in HOS in the hosted VMM.

In other words, in the present approach, the VMM is protected from both the HOS and all the guest operating systems. Even a failure or crash of the HOS will not lead to a failure of the VMM described herein. If, in the event of an HOS crash, the VMM's ability to work with I/O devices will be blocked and other VMs would not be able to function normally. Notwithstanding this, the VMM and all others VMs would still be "alive" and the VMM could execute some recovery procedures to prevent data loss in the VMs. Note that a new HOS can be raised to provide usability of VMs. For example, it is possible for the VMM to safely suspend the secondary VMs, restart the HOS in the primary VM, and then resume the secondary VMs normal work without any loss of data.

Note also that sometimes due to a particular virtualization strategy, the VMM could allow for a particular VM to have direct access to particular I/O devices (so called PASS-THROUGH devices).

Also, sometimes due to the virtualization strategy, the VMM can include additional secondary scheduling responsibilities for scheduling its VMs. In this case, the HOS is responsible for scheduling the VMM and its own processes and the VMM is responsible for scheduling of its VMs.

Different embodiments can implement different VMM scheduling approaches, such as:

1. The VMM does all the scheduling. This is primarily used for the non-hosted VMM approach, and it can be more efficient for some embodiments described herein (for example, for Intel's virtualization technology).

2. The HOS does all the scheduling. The VMM controls the VM that contains the HOS (i.e., the primary VM).

3. The HOS does the primary scheduling, and the VMM does the secondary scheduling. This is more efficient for hosted VMMs and it could be efficient for some embodiments described herein.

Figure 1:
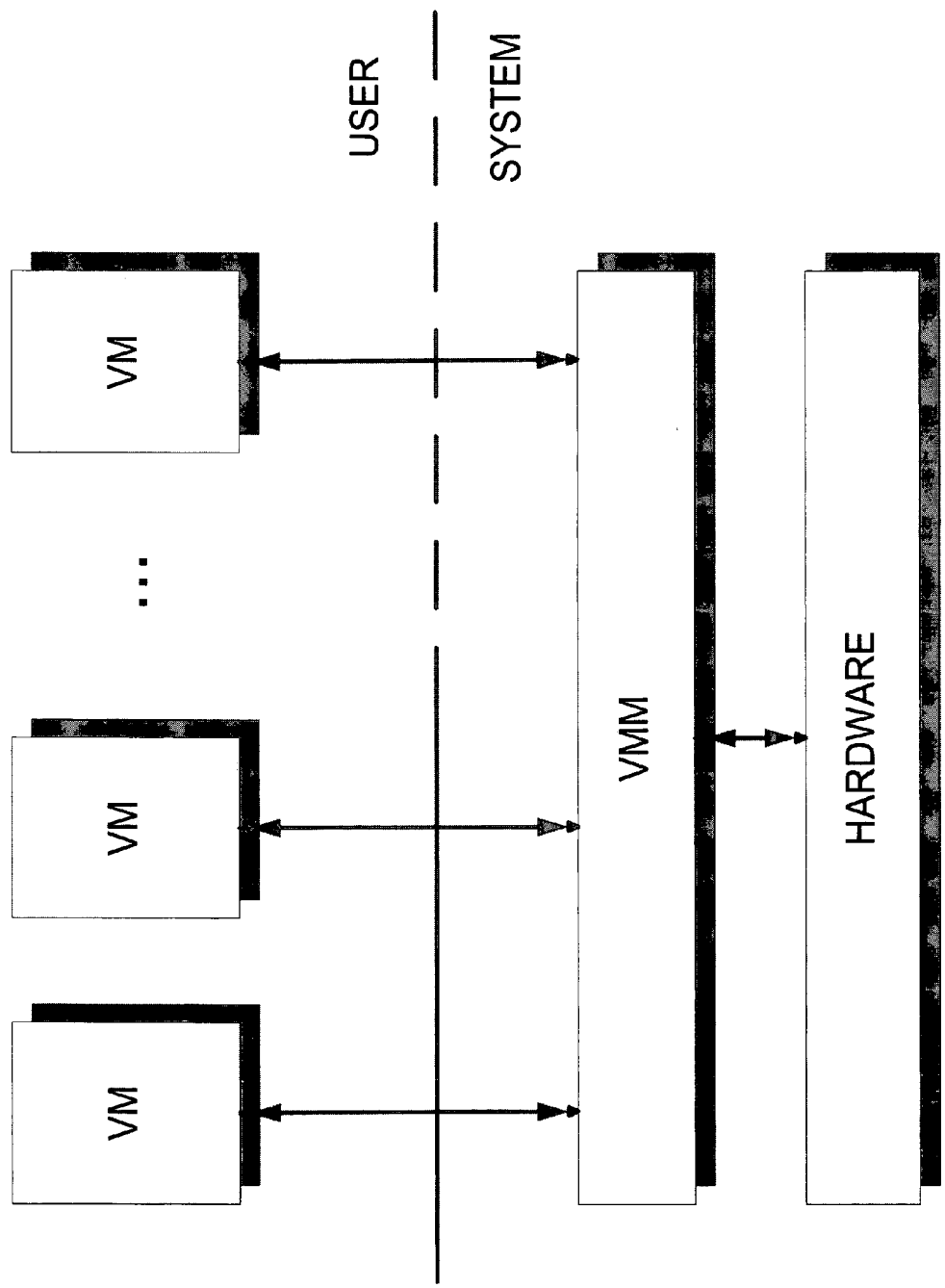
FIG. 1 illustrates a conventional non-hosted VMM architecture.
Figure 2:
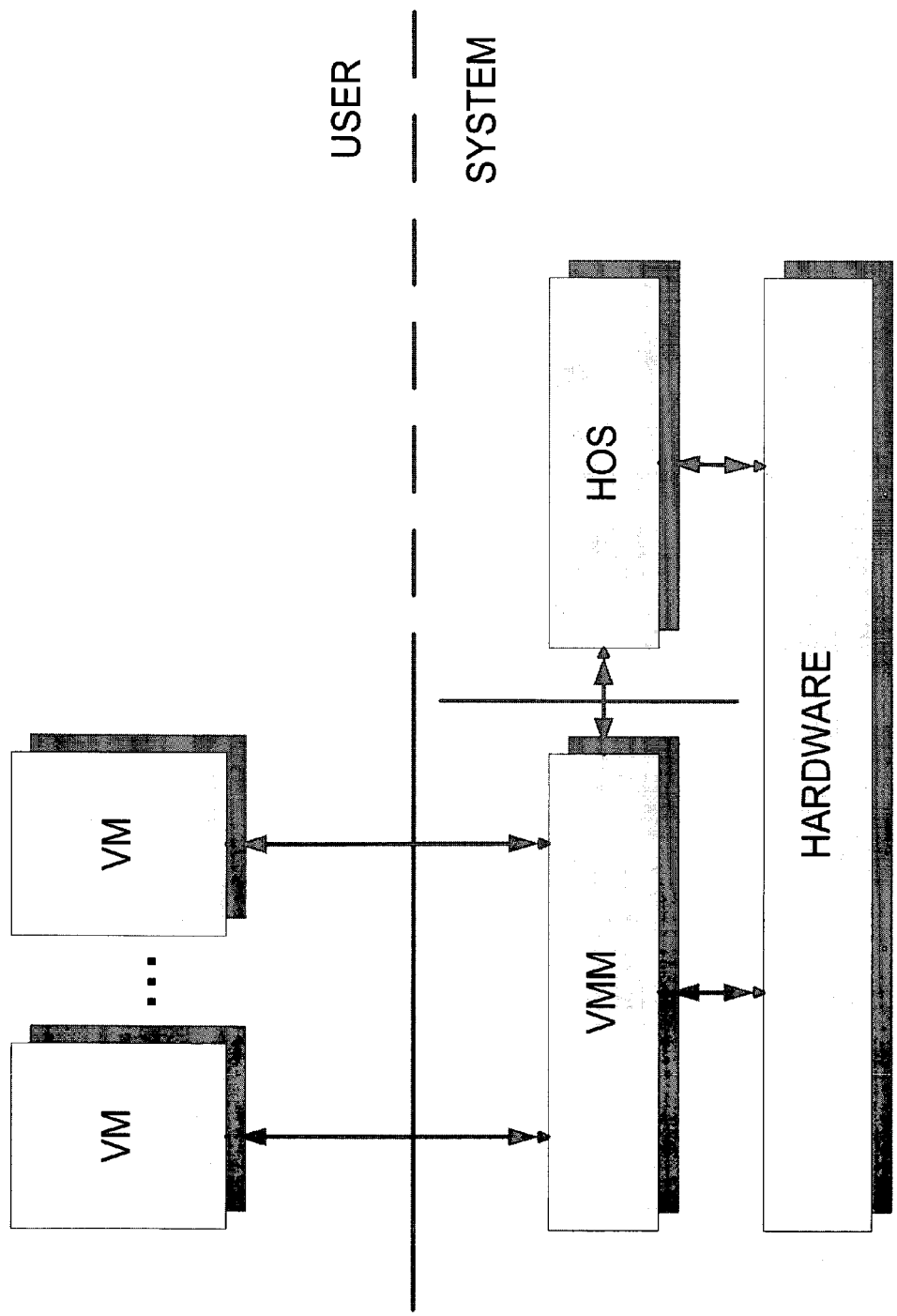
FIG. 2 illustrates a conventional hosted VMM architecture.
Figure 3:
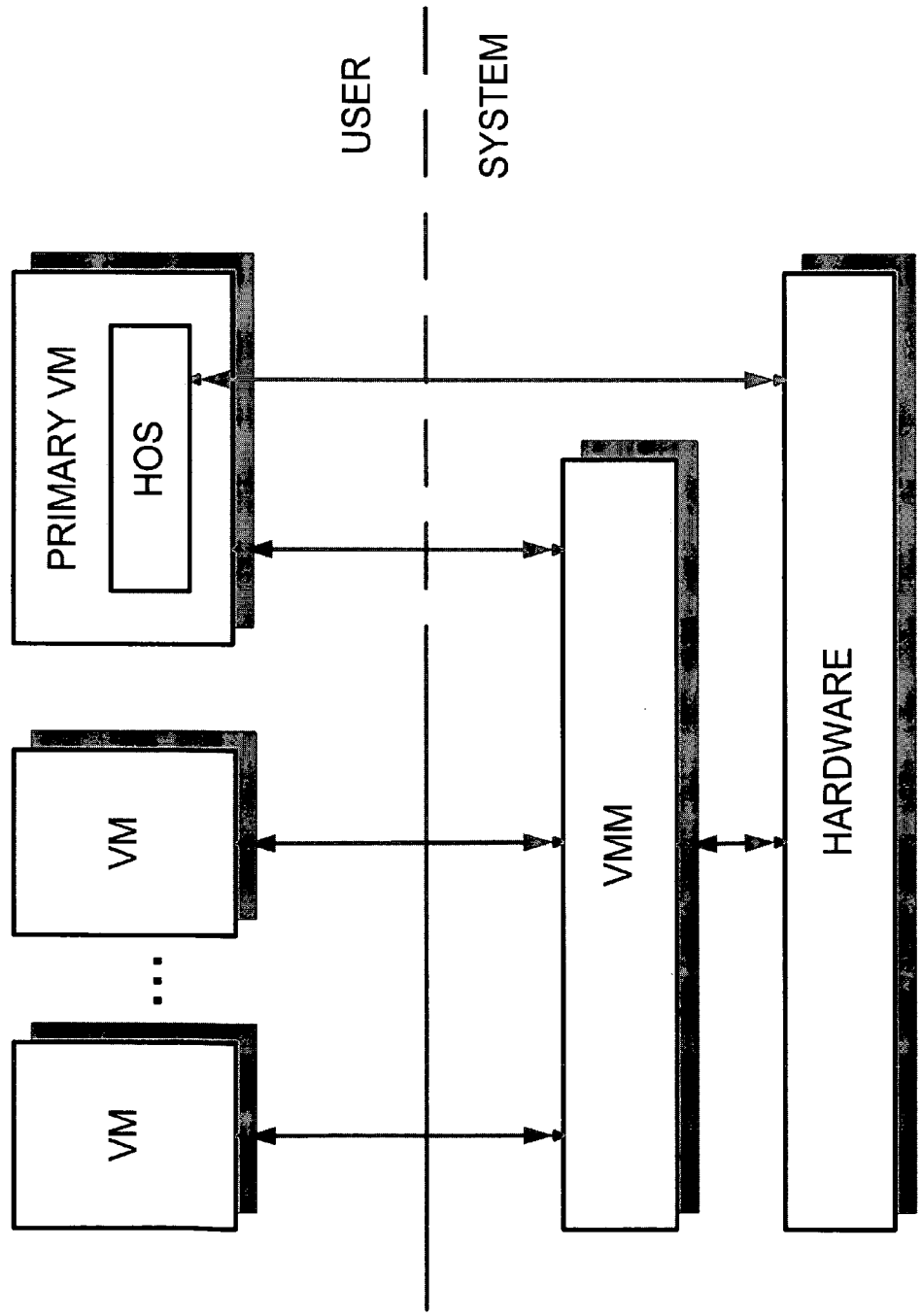
FIG. 3 illustrates a VMM architecture according to one embodiment of the invention.

As described herein, and as illustrated in FIG. 3, a Virtual Machine Monitor can be included in a computer system that is running a host operating system (HOS). One way to implement the VMM as described herein is by loading a special boot manager at the moment of startup of the physical computer, prior to the start of the host operating system. The VMM creates a primary Virtual Machine, and starts loading the host operating system within the primary Virtual Machine, rather than at system level. Thus, the host operating system becomes the first of the guest operating systems.

In one particular special case, the primary Virtual Machine (primary VM) is setup such that the host operating system has a PASS-THROUGH access to the actual hardware of the input/output devices, although not necessarily to all of them.

In an alternative embodiment, the VMM is loaded and starts working at the system level with the help of a dedicated driver in the host operating system. The VMM creates the primary Virtual Machine, and transfers the host operating system from the system level to within the primary Virtual Machine, without a partial or complete rebooting of the computer. In this manner, the HOS becomes the first guest operating system. In the present discussion, the term "HOS" is used to designate a host operating system that can be used as a means for supporting VMM's operability.

The primary Virtual Machine can also be structured such that the HOS has direct (PASS-THROUGH) access to the actual hardware of the input/output devices.

After the loading of the VMM under either approach described above, the VMM is configured in a manner that has at least one (or possibly all) of the characteristics described below:

1. The VMM has system-level privileges, for example, Ring 0 privileges for the Intel IA-32 architecture, or "root" for the VT-X architecture.

2. The VMM is connected to the only primary VM.

3. The primary VM has direct (PASS-THROUGH) access to I/O devices.

4. The HOS is launched within the primary VM, and does not have system-level privileges.

5. The HOS has direct (PASS-THROUGH) access to some of the I/O devices.

6. The VMM can launch any number of secondary Virtual Machines, none of which have system-level privileges.

7. The secondary Virtual Machines have no or reduced direct access to the input/output devices.

8. There are at least some I/O devices that are directly controlled by the host operating system in the PASS-THROUGH regime and are not accessible by the secondary VM.

9. Inside a secondary Virtual Machine, any of the supported guest operating systems can be installed and/or launched.

10. The VMM emulates virtual I/O devices for the guest operating systems within the secondary Virtual Machine (In other words, the VMM passes I/O requests to the HOS for emulation or execution. Some I/O emulation can be done in the VMM without access to real hardware, but some emulation may need to communicate with the real hardware with the help of HOS).

11. The VMM uses the primary Virtual Machine and the HOS to work with actual hardware of the I/O devices (in other words, without emulation).

In one particular embodiment, when PASS-THROUGH access to I/O devices is implemented, it is understood that the HOS still has a monopoly on control over these I/O devices, when it is launched within the primary Virtual Machine. The access of the HOS and of the primary Virtual Machine to the I/O devices can be set up by the VMM based on a chosen virtualization strategy. For example, the HOS can be prohibited to directly access some I/O devices, and control over these devices can be either handled by the VMM, or by any of the secondary Virtual Machines.

Note that in the present discussion, I/O devices are not only such devices as keyboards and printers, but also server I/O ports, network I/O devices, control registers and privileged areas of memory, which are specifically designed for exchange of data between devices and storage of system level information (for example, for storage of data relating to I/O device function and control).

As yet another embodiment, the VMM by itself is not a full-fledged operating system. Such a VMM can lack some or all device drivers, and, in some cases, can lack the ability to directly control hardware I/O devices. In this case, the VMM is installed with the host operating system, and uses HOS's APIs to work with the I/O devices. Only the VMM has system-level privilege, and works on a physical computer (in other words, some instructions are either emulated or handled using PASS-THROUGH to other contexts).

The HOS does not have system-level privileges, and works within a primary Virtual Machine. At the same time, the HOS can have direct (PASS_THROUGH) access to the I/O devices. The VMM can create any number of secondary Virtual Machines, which do not have system-level privileges, and cannot work with I/O devices directly. The VMM emulates I/O devices for the secondary Virtual Machines, and uses the primary Virtual Machine and the host operating system to work with actual hardware of the I/O devices. The VMM organizes the scheduling of the Virtual Machines.

At the same time, it should be noted that a complete absence of drivers from the VMM (and other similar system type utilities) is not a requirement of the invention, but may be realized in some embodiments of the invention.

Due to the fact that it is possible as a result of the failure or crash of the HOS to block I/O for all the other Virtual Machines, since all the other Virtual Machines can implement their I/O through the HOS, in one particular embodiment, when the HOS crashes, the VMM can freeze or suspend execution of the other Virtual Machines. After this, the HOS can be restarted or rebooted inside the primary VM, or a different HOS can be started, such that it can support the functioning of the secondary Virtual Machines. As yet another alternative, the configuration of one of the secondary Virtual Machines can be updated such that the guest operating system in that secondary Virtual Machine receives the status of the host operating system and the corresponding VM gets a corresponding privilege level. Subsequent to that, the other Virtual Machines can restart their execution, without a loss of data. Alternative recovery procedures can also be used by the VMM to prevent data loss and restore operations of the VMs.

The VMM controls sharing of system resources, including scheduling processes and monitors, and controls execution of the instructions running inside the VMs. In other words it controls guest instructions or instructions associated with a VM.

The VMM running as a host operating system with the truncated functionality and full access to the hardware resources is provided by means of a single operating system (e.g., the HOS), which runs under the control of the VMM. At the same time control and monitoring functions may be distributed among the VMM, the primary VM, HOS and secondary VM's depending on the hardware and software (e.g., HOS) architecture.

At the same time, the VMM may control other operating systems running with lower level of privileges than the main operating system (HOS). Also, the secondary VMs may have their own additional VMMs, which control corresponding VMs. Such additional VMMs can, in their turn, run under the control of the primary VMM or the HOS.

Some instructions that can cause system crash or another malfunction of the computing system are forbidden in the Virtual Machines having the lowest level of privileges, and are emulated by means of the VMM or passed to the host operating system for execution.

Some instructions that have to be emulated are of the type that intend to halt or reset processor operations. Some instructions that may be realized by means of the host operating system are read/write instructions or other instructions that are directed to accessing the I/O hardware.

In the Intel family of processors, the various privilege regimes are referred to as "privilege levels," and are set through appropriate processor registers. In the Intel IA-32 architecture, Ring 0 and Ring 3 privilege levels can be used to implement the approach described herein. It should be noted that although the particular examples given in this discussion relate to the Intel architecture, the invention is not limited to the Intel architecture, and is applicable to any number of processor families and processor architectures.

In one embodiment of the invention (in terms of Intel x86 architecture), the Primary VM and VMM runs in the Ring 0 privilege level. Also, secondary VMs (and the HOS) run in the Ring 3 privilege level. Some instructions that are permitted in the VMM context are forbidden in the context of the primary VM, so the VMM can monitor and control execution of instructions inside the primary VM. Also, the primary VM and the VMM can have different privilege levels that may be implemented using the Intel VT technology. (i.e., the Intel virtualization technology for IA-32/64 processors). In one embodiment, the VMM can run in root mode, and the HOS can run in non-root mode.

It should be noted that when other (non-Intel) types of processors are used, different terminology may be used to describe the privilege levels. Also, the mechanism of switching between the privileged levels can be different, although the concepts described here are still applicable therein.

In different embodiments, the HOS has the same or higher privilege level than other operating systems launched using the VMM, the HOS here can be different from conventional HOS's, since here, the HOS works under the direction of the VMM (instead of vice versa).

In one embodiment, depending on how the hardware is configured, the VMM can emulate, ignore, or forbid execution of particular instructions, as well as certain sequences of certain instructions, both within the secondary Virtual Machines and the primary Virtual Machine. In this case, sets of instructions that can be emulated, executed, or be forbidden, can be different for the primary and secondary Virtual Machines. In the Intel architecture, when using the VT technology, selecting a set of allowed instructions and enabling safe switching of context can be done at the hardware level, by appropriate commands, or by changing flags in appropriate processor registers and structures (for example, VMCS structure tuning).

Additionally, in one embodiment, the VMM provides for automatic changes of privilege levels, depending on the context in which the code is executed. Thus, when executing the code of Guest OS's in the secondary Virtual Machines, certain I/O operations are forbidden. At the same time, the same I/O operations can be permitted in the environment of the primary Virtual Machine, in which the HOS is running. This ensures a safe execution of such I/O instructions in the primary Virtual Machine. Also, when transferring control to the primary Virtual Machine running the HOS (which is done under VMM control), the changing of the privilege levels is also provided to such a level that insures safe execution of such instructions.

Generally, a "context" is simply a collection of related processes whose names are not known outside of the context. Contexts partition operating system's name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process," thus providing a degree of security. The context process often acts as a switchboard for incoming messages, rerouting them to the appropriate subprocesses in its context.

Normally, there is a single primary Virtual Machine, and most commonly, though not necessarily, it is set up so that it can directly access I/O devices and their actual hardware. Secondary Virtual Machines (of which there can be any number) are set up such that they cannot directly use actual hardware of the I/O devices. The VMM is responsible for emulation of the I/O devices for the secondary Virtual Machines. The VMM uses the primary Virtual Machine to work with the actual hardware of the I/O devices. The VMM works at a system privilege level, while the primary and secondary Virtual Machines work at a non-system (user) privilege level.

The host operating system works within the primary Virtual Machine, and cannot execute privileged instructions on the real processor. The VMM works in a native mode on the real processor, and can execute privileged instructions. When it is impossible, for some reason, to transfer the host operating system to the Virtual Machine, the VMM is installed on the real computer using a dedicated boot manager for VMM, and receives control at the very beginning of the startup of the computer. Upon loading, the VMM creates a primary Virtual Machine, and loads the host operating system within the primary Virtual Machine. When the HOS is transferred from the host PC into the Primary VM, any changes in hardware need to be addressed as well. This will depend on virtualization policy part of the devices in Primary VM are changed to virtual ones. Once the transfer is complete, the HOS might face some changes in hardware. Depending on the HOS and on these changes, there are 3 possible scenarios: 1) the HOS can handle such changes on the fly, 2) the HOS should be rebooted to work in new environment, and 3) the HOS should be reinstalled in the new environment.

In yet another embodiment, the VMM can be installed on a bare PC using a boot manager. This VMM still lacks device drivers and couldn't support secondary VMs full functionality without the HOS since the HOS contains proper system utilities. Subsequently, the HOS can be installed under the VMM in the primary VM. Then the VMM works the same way as described above, in the embodiment discussing the boot manager.

In this embodiment, the VMM does not work under the control of an already installed HOS. However, it still runs the HOS in the primary VM with reduced privileges and still uses it to access the I/O devices. This embodiment will be helpful for a new generation of HOS with support for hardware-based virtualization technology, such as Intel's VT-X (and/or VT-I) technology. During installation on a bare PC, such an HOS can detect the presence of VT-X and store this information in, e.g., a registry. When restarted in primary VM without VT-X support, it could refuse to boot. Installation of the HOS under VMM in the primary VM with already reduced privileges (in the absence of VT-X) solves this problem. Here, the VMM can be installed on top of the HOS, and then HOS can be reinstalled inside the Primary VM.

The question of how to distribute the privileges between the various "actors" in the virtualization schemes can be framed more broadly as follows: given the various components (VMM, VM, Primary OS, Guest OS), what is the optimal way to distribute the privileges and responsibilities between these components, and how can this distribution be made secure and portable? For example, one conventional way is to essentially replace the primary operating system with the VMM—the VMM therefore becomes itself, for all practical purposes, an operating system. This has some advantages in terms of efficiency—for example, any attempt by the Guest OS to execute privileged instructions (that it is actually not entitled to) trigger an exception, and the VMM immediately handles it. However, this approach can require that all the drivers be placed in VMM space. This is frequently a source of problems, since there are hundreds (or even thousands) of devices that most operating systems need to support. For example, there are numerous vendors of hard disk drives (and numerous models and types of hard disk drives), CD ROM drives, DVD-ROM drives, floppy disks, video cards, network cards, Wi-Fi cards and modems, mice, trackballs, etc. Most of these drivers are usually written by vendors themselves—this means including in the VMM a lot of untrusted third party code that runs the most privileged level and can damage the system] A VMM that displaces the original operating system therefore needs to itself have all these drivers. This, obviously, has the potential to compromise security. It is worth noting that many of the complaints about the instability of the Windows operating system actually result not from bugs in the Windows operating system code itself, but from bugs in the drivers, which in the Windows operating system live in kernel space.

Figure 4:
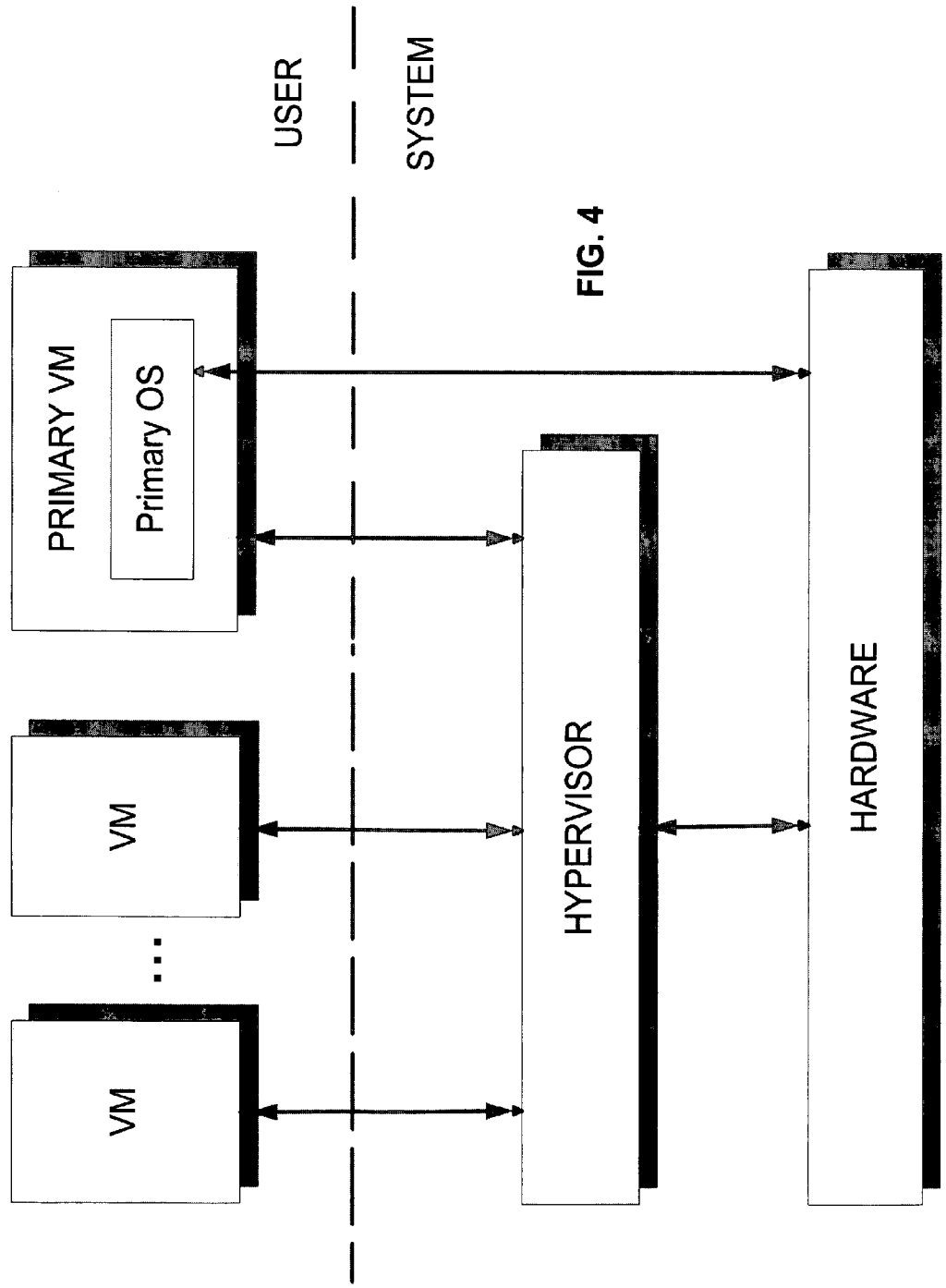
FIG. 4 illustrates a Hypervisor-based embodiment of the invention.

One way to deal with the problem of VMM having a large footprint (in other words, VMM having an amount of code that is comparable to the amount of code of a full-fledged operating system, such as LINUX or Windows) is to add a component called a "Hypervisor," shown in FIG. 4. The Hypervisor can have exclusive control over the physical resources of the system, although it can grant certain rights to other components of the system, such as to the Primary OS, or, in some cases, to the Guest OS.

The degree of control by the primary OS (POS) and the VMM over processor resources and the processor's privileged instructions is an important issue that has been addressed in various ways over the years. The PVM uses a particular mechanism called the "Lightweight Hypervisor," which restricts the ability of both the POS and the VMM to issue instructions that affect the interrupt descriptor table (IDT). Thus, the Lightweight Hypervisor processes all interrupts and exceptions in the system and dispatches them to the POS and VMMs based on its virtualization policy.

Hypervisor-based VMMs, illustrated in FIG. 4, combine the advantages of the prior art systems, and eliminate major disadvantages. The Hypervisor runs on the system level and creates Virtual Machines on the user level. One of the VMs runs a so-called "Primary OS" (POS) and has privileges to handle some of the hardware directly. Other VMs and the Hypervisor uses Primary OS and its hardware drivers for communication with the actual hardware. At the same time, the Hypervisor employs efficient memory management, processor scheduling and resource management without the help of the Primary OS. The advantages of the Hypervisor-based approach are high VM isolation, security, efficient resource management and a small trusted Hypervisor footprint.

Figure 5:
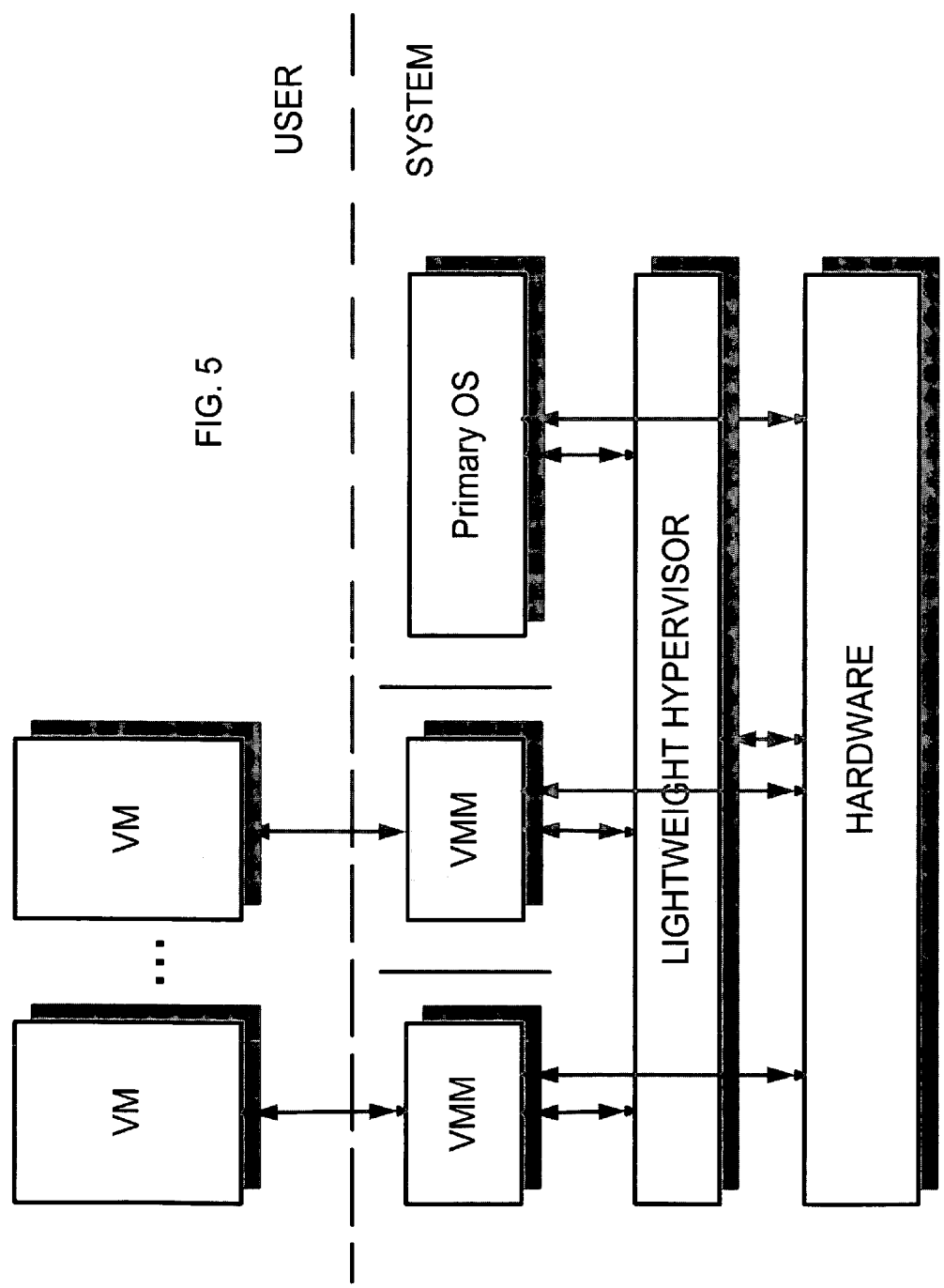
FIGS. 5 and 6 illustrate the Lightweight Hypervisor embodiment of the invention.
Figure 6:
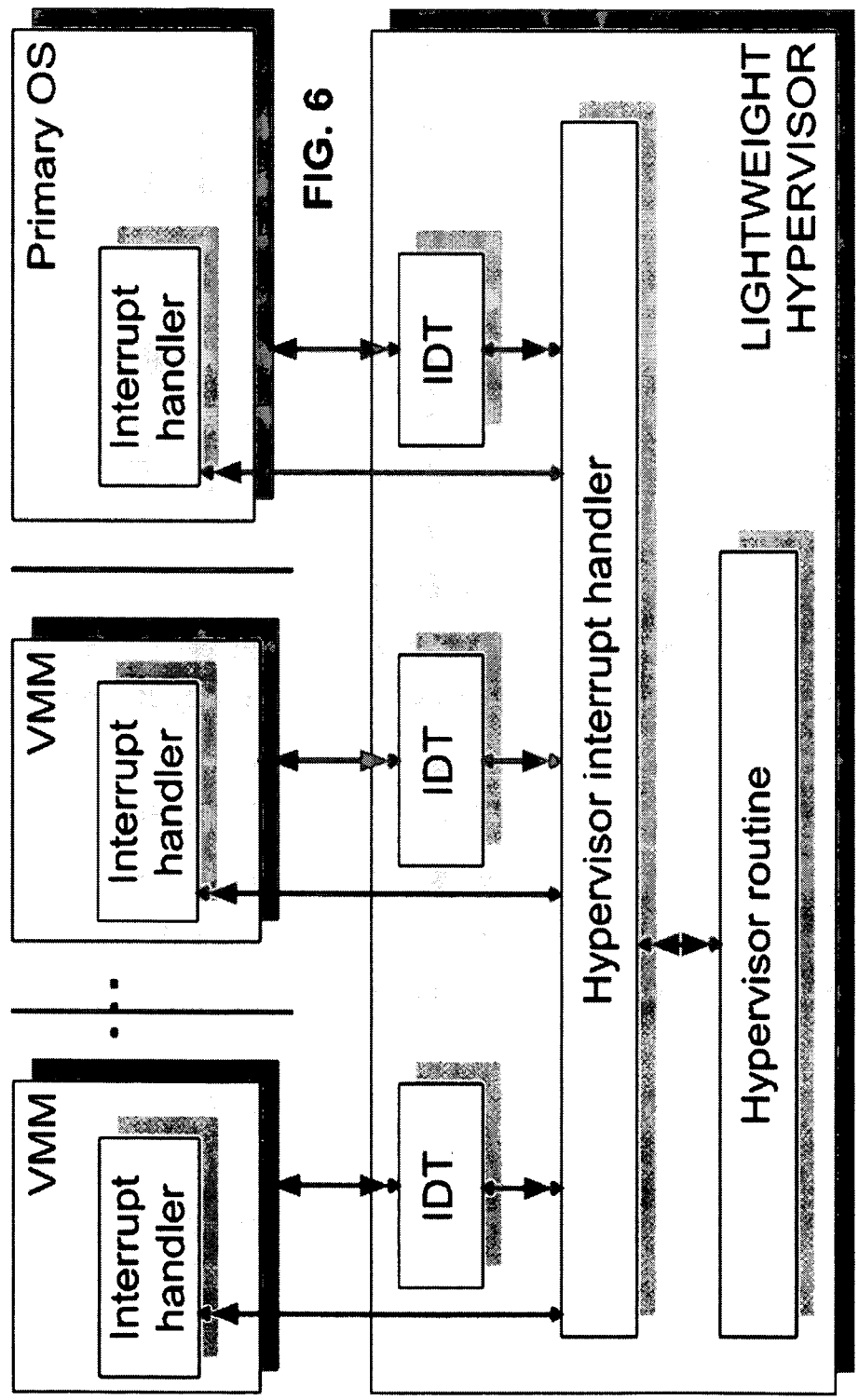

The Lightweight Hypervisor, illustrated in FIGS. 5 and 6, runs on the system level, reloads the Interrupt Descriptor Table (IDT) and protects it from modification by the primary OS and the VMM. The primary OS and the VMMs are not allowed to modify IDT and they are not allowed to independently process interrupts. The Lightweight Hypervisor coexists in all address spaces (primary OS' context and VMMs' contexts) and exclusively processes all hardware interrupts and exceptions. It is responsible for interrupt forwarding, context switching between the primary OS and VMMs, and for efficient resource scheduling.

Advantages of the Lightweight Hypervisor are: excellent performance, good VM isolation and security, efficient resource management and small trusted lightweight Hypervisor footprint. Disadvantage of the Lightweight Hypervisor is less VM isolation than in full Hypervisor architecture.

Thus, the Lightweight Hypervisor is a small piece of software that helps manage VMMs by handling hardware resource interrupts events. The Lightweight Hypervisor captures the primary IDT pointer and replaces it with its own, as shown in FIG. 6.

The Hypervisor IDT points to Hypervisor's handlers that first receive control when any interrupt or exception is raised, perform various checks, and then forward control to the original Primary OS or VMM handler. Therefore, the Hypervisor adds additional security, since it can filter or ignore some debug event accesses to Hypervisor space.

The Lightweight Hypervisor enables context switching between VMM and POS. Context is described by processor structures that are involved in memory access mechanisms (such as page directories and page tables, GDT/LDT tables in Intel architecture). The Hypervisor manages the IDT for every context (primary OS and VMM).

Each context has a descriptor that stores all necessary information about context state. Switching between contexts means switching between their descriptors (loading the corresponding processor state saved in it). The VMM's context descriptors can include saved state of the space from which they were called from (Primary OS state). Switching between Primary OS context and VMM one is permitted.

The Lightweight Hypervisor manages all IDTs for all contexts (VMM and Primary OS). IDT management includes:

1. allocation and freeing pages for the IDT.
2. modification of IDT entries. VMM uses hypercalls for registering VMM handlers and all writes to Hypervisor IDT are emulated by the Hypervisor.
3. protection of IDT and emulation of direct writes to the IDT.

Handling hardware interrupts helps manage periodical timer events, which can be used for:

1. timer emulation in VM by means of regular high quality (resolution) timer events;
2. scheduling VMMs without primary OS decision and interaction;
3. passthrough device emulation without interaction with the primary OS, etc.;
4. preventing undesirable direct interactions between the primary OS and actual hardware.

Figure 7:
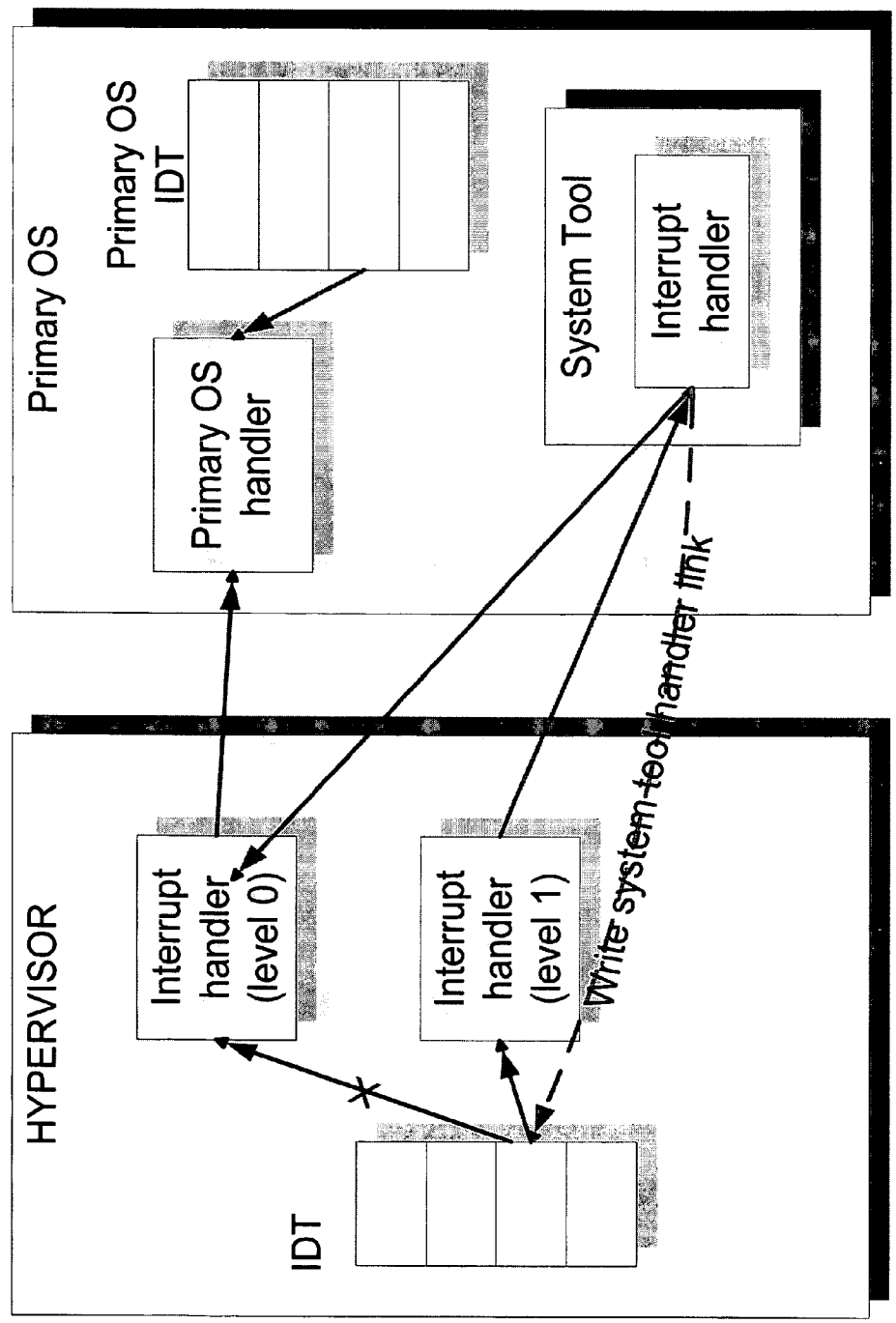
FIG. 7 illustrates how the Lightweight Hypervisor protects Hypervisor IDT for primary OS from modification.

The Lightweight Hypervisor protects Hypervisor IDT for primary OS from modification and any attempt for IDT entry modification will be passed through Hypervisor, as shown in FIG. 7.

Initialization of the Hypervisor includes, e.g.:

1. Saving primary OS IDT pointer (for all processors)
2. Allocating Hypervisor IDT for primary OS (for each processor)
3. Forming Hypervisor handlers
4. Protecting from modification Hypervisor IDT for primary OS (for example, it could be implemented using Memory Management Unit (MMU) read/write protection mechanism).

After initialization, the Hypervisor begins to handle Primary OS interrupts. First the Hypervisor detects the exception type and performs useful actions for some of them. After that the Hypervisor makes a decision to ignore the event or forward to Primary OS (by using previous Primary OS IDT table content pointed to by a saved pointer) or to active VMM.

The Hypervisor can be implemented as a driver for the Primary OS. It activates after the first VM starts and deactivates after the last VM stops (alternatively, it might not be deactivated and will stay active until POS reboot). Alternatively, the Hypervisor can be a separate, independently-loaded binary file.

After activation, the Hypervisor loads its own IDT instead of the Primary

OS IDT, and takes control over all interrupts and exceptions. Hypervisor performs IDT virtualization for POS and for all VMMs. In one of embodiments it could be done following way. The Hypervisor protects its IDT against writes, and emulate all attempts of the primary OS and of its subsystems to write to the IDT. When writing to the IDT takes place, the Hypervisor receives a page fault (PF). It decodes the POS instruction that caused the PF and gets a new value that the POS tried to write into IDT. After that, the IP (instruction pointer) is corrected to point to the next POS instruction, and POS execution is continues as nothing was happened. The Hypervisor traces all writes to the IDT by HOS (POS) and stores all values for each IDT interrupt vector in special lists. Thus, even though an actual modification of IDT is prohibited, the Hypervisor has all the up-to-date information about current IDT vectors handlers. In some embodiments, these lists can be used for correct interrupt forwarding to newest POS handlers. In other embodiments, the interrupts will be delivered only to the original IDT handlers (which were valid before Hypervisor activation).

The Hypervisor is co-resident in the Primary OS and all VMM address spaces and handles all interrupts in all contexts. The Hypervisor is responsible for forwarding interrupts to the Primary OS and VMMs. The Hypervisor detects primary OS' and its subsystems' write access to the IDT, and emulates and maintains an interrupt subscription list for Primary OS components.

The Hypervisor is responsible for VMM and Primary OS context switching. The Hypervisor offers number of service hypercalls available both for VMM and the Primary OS, such as:

1. Subscription for a particular interrupt;
2. Switch from the Primary OS into given VMM;
3. Switch from the VMM into Primary OS.
4. Switch from one VMM to another VMM;
5. Memory management between VMMs;
6. Time scheduling between VMMs;
7. Creating new VMM and VM;
8. Deleting VMM and VM;
9. Subscription for particular I/O device managed by Hypervisor/POS;
10. Performing I/O operation with particular I/O device managed by Hypervisor/POS.

Figure 8:
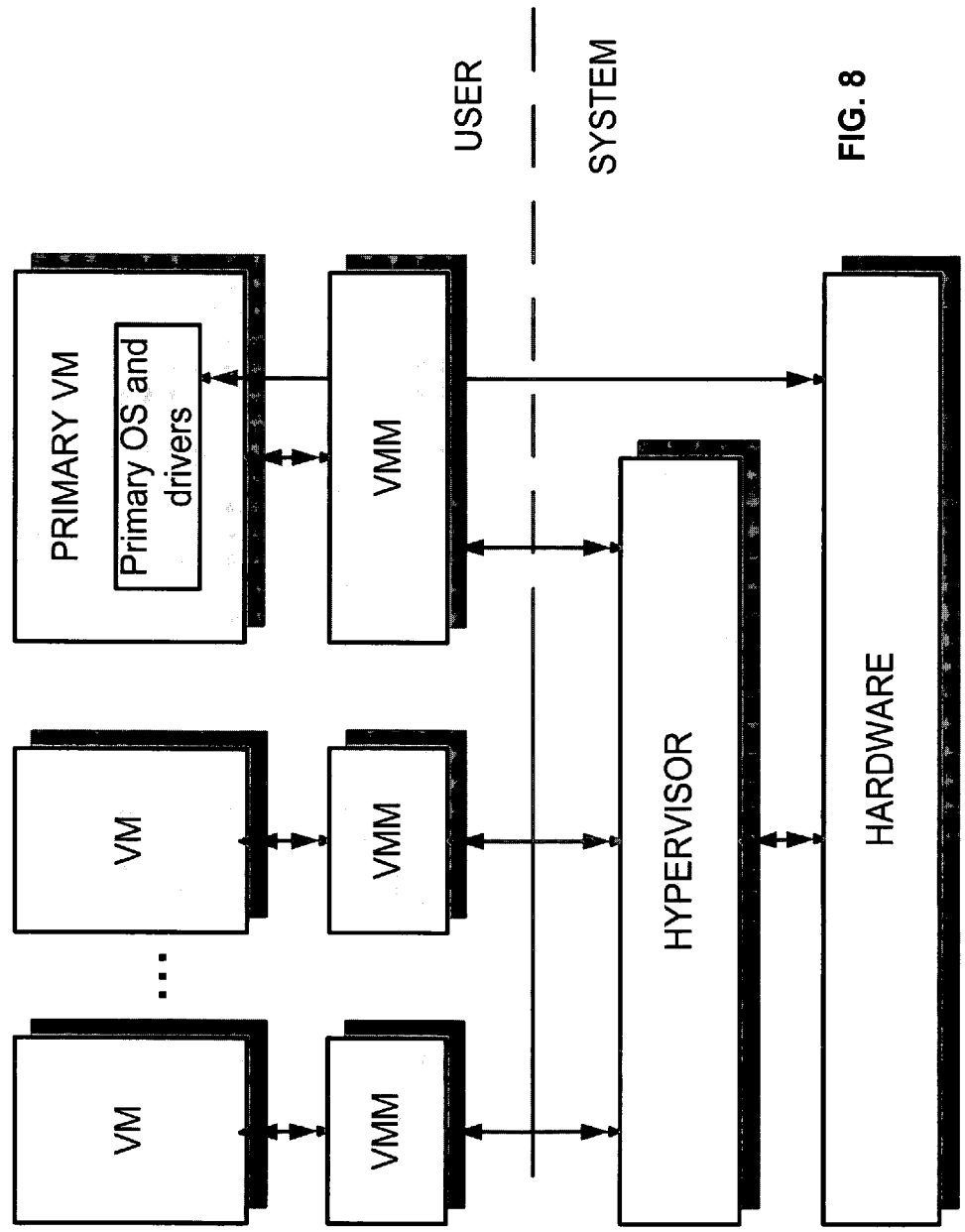
FIG. 8 shows a driverless Hypervisor embodiment of the invention.

In one embodiment, the Hypervisor itself need not have any drivers at all—all the drivers can be placed within the Primary OS. This is shown in FIG. 8. Therefore, whenever the Primary OS attempts to interact with the physical hardware—such as the hard disk drive, the network card, etc., the Hypervisor permits it to do so. Placing all the drivers within the Primary OS means that the Hypervisor itself can have a small footprint, for example, on the order of 50,000-100,000 lines of code. This is relatively small compared to the amount of code required for most modern operating systems, which often have on the order of a million lines of code or more. With a footprint this small, the task of ensuring that the Hypervisor can be fully trusted, and is "bug-free," is much easier.

Figure 9A:
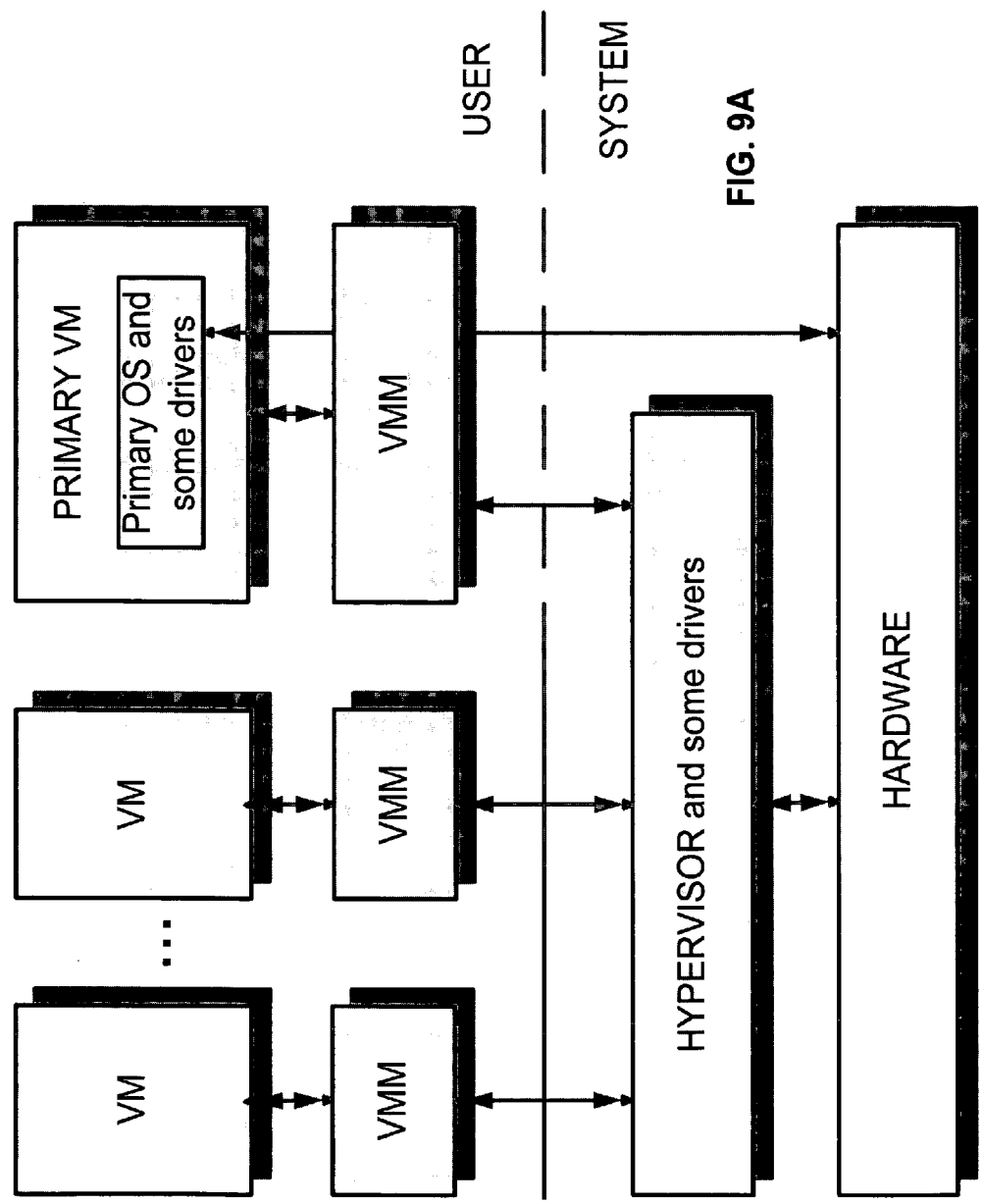
FIG. 9A shows a Hypervisor with some drivers, and a Primary OS with some drivers.

It should be noted that while one embodiment of the invention may be implemented as an essentially "driverless" Hypervisor, where all the drivers are located in the Primary OS, which is part of a VMM, other alternatives are possible. For example, some drivers are very well standardized, and do not present appreciable security risks. And written by VMM developers itself to make maximum optimized for virtual machines. This is shown in FIG. 9A. For instance, the driver for the IDE controller for a hard disk drive is one such driver. Similarly, SCSI controllers have standardized drivers, which may be placed in the Hypervisor, as an optimization. In other words, a larger footprint of the Hypervisor can be traded off against efficiency, since, with the hard disk drive controller's driver in the Hypervisor, there is less overhead when passing disk access requests between the Guest OS's and the Primary OS. FIG. 9B illustrates it in additional detail how the POS handles all of the devices except for the IDE controller (hard disk drive controller). The Hypervisor handles the IDE controller itself by means of a trusted driver that is specially optimized for work with VMs.

Another advantage of the approach described herein is in freeing the Virtual Machine developer from having to develop his own set of drivers. By allowing the Primary OS to use its drivers to interact with the hardware, the developer of the Hypervisor does not face the task of either writing his own set of drivers for each device that might conceivably be connected to the computer (a daunting task, since such devices today number in the thousands), or having to adapt someone else's driver model (such as LINUX) to working within the Hypervisor itself. This means that the development cost of such a Hypervisor-based virtualization approach is dramatically less than it otherwise would be.

Again, it is worth recalling that many of the complaints about bugs and crashes (and general instability) of the Windows operating system derives not from mistakes by Microsoft programmers, but from mistakes of the third-party vendors who supply the driver software. As a practical matter, when the Hypervisor developers are confronted with the task of dealing with third party drivers, they may be just as likely to write a product that is similarly "buggy." Therefore, by using, as a Primary OS, an already existing operating system (such as Windows XP, Windows NT, LINUX, etc.), the development time for the overall virtualization system can be shortened considerably.

Furthermore, it should be noted that new types of hardware appear all the time, such as new video cards, new storage devices, new network cards, new wireless devices, etc. For most common operating systems, the vendors of these devices write the drivers practically as soon as the devices themselves appear on the market (and frequently are supplied with the device itself). Thus, the Virtual Machine developer does not need to worry about supporting a never-ending stream of new hardware from third-party vendors, since the vendors themselves will provide the driver support for standard operating systems.

Another advantage is that there is no need to write a separate "Service OS" whose primary task is device/hardware interface and driver management. Writing even a limited-purpose operating system is a complex task. In the approach described herein, this task can be avoided, since the Primary OS serves in place of any such driver-dedicated Service OS. The approach described herein permits using any standard operating system as the primary operating system, where the Primary OS also functions as a Service OS.

The Primary OS can be easily migrated to work under the control of the Hypervisor. This can be accomplished through relatively simple installation.

There are at least three ways how to migrate a running Primary OS into the VM. One of the major "features" of the migration is a difference between host PC hardware and Primary VM hardware. Some Primary VM hardware remains the same since Primary VM is tuned by Hypervisor to have direct access to it. But some of Primary VM hardware is emulated and could be different from host PC's hardware.

The question is how the particular Primary OS could handle changes of hardware. Most of the modern OS can handle some hardware changes on the fly (using so-called PnP technology).

1. If the Primary OS can handle particular hardware changes between host PC and Primary OS without rebooting, then the Primary OS will be transferred on the fly as follows:
    Stop Primary OS execution
    Save Primary OS CPU context
    Save Primary OS memory
    Create Primary VM
    Grant Primary VM access to some host PC devices
    Load saved Primary OS CPU context into virtual CPU
    Load saved Primary OS memory into VM
    Resume Primary OS execution inside Primary VM 2. If the Primary OS can handle particular hardware changes between host PC and Primary OS with rebooting and possibly some additional changes on Primary OS boot disk, then Primary OS will be transferred as follows:
    Install boot manager component of Hypervisor
    Restart Primary OS
    During host PC boot, the Hypervisor takes control before the Primary OS
    Create Primary VM
    Grant the Primary VM access to some host PC devices
    Made some modifications to Primary OS boot disk if needed (change some drivers, config files, etc. according to the particular migration scenario)
    Start the Primary OS booting process inside the Primary VM under control of Hypervisor
    Resume Primary OS execution inside Primary VM 3. If the Primary OS cannot handle particular hardware changes between host PC and Primary OS, even with rebooting and needs a full reinstall:
    Install boot manager component of Hypervisor
    Restart Primary OS
    During host PC boot, Hypervisor takes control before the Primary OS
    Create the Primary VM
    Grant Primary VM access to some host PC devices
    Initiate Primary OS installation process inside VM
    Resume Primary OS execution inside Primary VM One of the disadvantages of some conventional virtualization technologies, such as XEN, are that installation is relatively complex, normally requiring many hours of effort from IT personnel. As of early 2006, the XEN product has not caught on in the industry, in large measure due to the complexity of the installation, which for a lay user of a desktop is a virtually insurmountable challenge. In the approach described herein, whether server-based or desktop-based, installation is little different from installing another user application or a driver, where the user is prompted through the usual and generally familiar installation sequence, or from installation through the commonly used wizards.

It also worth noting that, up till now, Hypervisor-based systems have generally been found primarily, if not exclusively, in server-based environments, primarily due to the fact that installation and maintenance requires relatively skilled IT personnel, notwithstanding the fact that first Hypervisor-based systems were described two decades ago. The present approach is equally applicable to both server-based and desktop/laptop-based environments.

Thus, the present approach makes use of several components. The first of these is the Hypervisor, which has the highest privilege level of all the components, and can control access to any physical resource of the system. The Hypervisor, upon being launched, relocates the operating system that was previously running (the Primary OS) into a Virtual Machine with a VMM, and grant the VMM and the Primary OS certain privileges, for example, the privilege to directly access some hardware devices, such as a disk drive. Other Guest OSs are launched in other Virtual Machines, and are treated as any other Virtual Machine (in other words, they themselves think that they are the real operating system, while any attempt by them to perform privileged operations or access hardware directly can be intercepted by either the Hypervisor or by the VMM. This is shown in FIG. 8, as discussed earlier.

Another way to classify the physical resources of the system that the Hypervisor controls, and that the Hypervisor grants, or not grants, access to, as far as the various operating systems are concerned, is sharable and non-sharable resources. This is shown in FIG. 10. A sharable resource is a type of hardware that any realistic operating system needs to work with, to be useful. For example, it is impracticable to have an operating system that does not have access to the hard disk drive. Similarly, very few modern operating systems can realistically function without access to the network card, or the video card (in the context of a desktop system). These are therefore examples of a sharable resources, where most, if not all the operating systems (whether Primary OS, or Guest OS) needs to have access to.

Other resources may be non-sharable, or pass-through, in the sense that the Hypervisor grants to a particular operating system (typically, to one Guest OSs, but not to any other Guest OS) is a floppy drive. For example, most laptops today do not have a floppy drive, although an external floppy drive can be connected to a laptop. This can be one example of such a non-sharable resource—the Hypervisor grants to one Guest OS the privileges for accessing the floppy drive directly, but the others are unaware of the existence of that floppy drive.

Other examples of non-sharable resource include devices like the display monitor, LPT port, the mouse or trackball, a Wi-Fi card, USB ports, etc. Other examples of non-sharable resources can be various devices that are infrequently connected to a computer. For example, many mobile phones today have a USB interface through which they can be connected to a computer, but a mobile phone is not a standard accessory supplied with a laptop or desktop. Other examples include removable devices not needed for day to day operation: removable media—floppy, CD/DVD-ROM, SCSI devices, USB devices—external drives, specific devices—card readers, banking devices, scientific devices, LPT/COM port and all devices connected to these ports.

The system's hardware can therefore be loosely divided into three groups, as shown in FIG. 10: 1) controlled exclusively by Guest OS 2) controlled by the Hypervisor, shared between VMs 3) controlled by the Primary OS, shared between VMs. Shareable devices could be controlled by Primary OS or by Hypervisor. Guest OS that wants to use that device should communicate Hypervisor or Primary OS (via Hypervisor or directly). Non-shareable devices are controlled by one Guest OS exclusively. An example of hardware controlled by the Hypervisor is the processor itself. Another optional example of such hardware is the IDE controller for the hard drive, which requires a well standardized driver with a relatively small footprint. Another example is the video card.

Doing this avoids the chain of interrupts and exceptions that would begin when the Guest OS attempts to access the hard drive, whereupon, in one embodiment the Hypervisor intercepts such an attempt and redirects it to the Primary OS, which has the driver for accessing the IDE controller, which then accesses the hard drive, and then passes the result back to the Hypervisor, which in turn emulates the behavior of the system such that the Guest OS thinks that it accessed the hard drive itself. Much of this complexity can be avoided by placing the IDE controller's driver in the Hypervisor. In the preferred embodiment, the VMM is responsible for virtualization/emulation, and the Hypervisor is responsible for granting access/protecting access, security and resource scheduling. In other words, in one embodiment, the Guest OS is unaware of the VM environment and tries to access IDE and being intercepted by VMM/Hypervisor. However, the VMM implementation not limited to this model, and the invention is not limited to VMM types described above.

As used in this context, the Hypervisor "controls" all the physical resources, in the sense that it can permit any component to access that resource, or not. The Primary OS and/or the Guest OS can, with the Hypervisor's permission and under the Hypervisor's control, can manage the hardware, including accessing it (in the case of the hard disk drive), and perform various other operations involved in the use of the particular hardware.

In other words, the Hypervisor grants to the other components the right to "do something useful" with the hardware, while the components (Primary OS, Guest OS) actually do that "something useful" with the hardware devices.

In the case of failure of the Primary OS, the Hypervisor has a number of options. One option is to shut down the Primary OS, and restart it with some state (registers, memory, GDT, etc.) that is known to be safe and functional. Another option is for the Hypervisor to handle the failures through some error handling routine, for example, giving the user the option to reload the registers to some specified values. Yet another option is for the Hypervisor to designate another of the Virtual Machines as the Primary OS, with an appropriate upgrading of the privilege levels and of that Virtual Machine, as well as various other administrative tasks needed for this purpose. Yet another option is for the Hypervisor to keep one or more Primary OSs "in reserve," where the reserve Primary OS (and the Virtual Machines that correspond to them) are essentially quiescent, except when activated. This is shown in FIG. 11.

As yet a further option, the Hypervisor, upon detecting that the Primary OS is having problems with managing the hardware, or is crashing, or is about to crash, can withdraw the privileges granted to the Primary OS that allow it to access the hardware, and, for example, grant those privileges to another of the Virtual Machines running a Guest OS, until the Hypervisor resolves the issues with the original Primary OS.

As an alternative, the operating system itself can have provisions for switching the underlying hardware on which it runs "on the fly." For example, if the operating system itself is able to dynamically switch from one network card to another, or from one type of disk drive to another (or one partition of a disk drive to another, etc.). Then, the Hypervisor can upgrade the status of a Guest OS to the status of the Primary OS, thereby taking advantage of that ability.

Once the need to treat the formerly Guest OS as the Primary OS no longer exists (for example, if the Hypervisor has resolved whatever problems caused the failure or crash of the Primary OS, and is ready to restart it), then the current Primary OS can be dynamically downgraded back to the status of a Guest OS, and the crashed Primary OS can be reactivated.

It should also be noted that running the Primary OS with less than the full privileges permits avoiding at least some of the sources of failures and instability. For instance, if the Primary OS itself decides to write something that it shouldn't to the hard disk drive (for example, the Primary OS itself replaces its own boot sector information with erroneous information), there is little that the Hypervisor can do about that. On the other hand, some of the bugs are due to developers' mistakes, for example, where some instruction tries to access an area in memory that it shouldn't, or it tries to transfer control to some page that isn't available, triggering a page fault. With the Primary OS having less than full privileges, mistakes of the second type can be more easily handled, when the Hypervisor detects them. To deal with the first type of errors, the Hypervisor needs an error recovery procedure (or a set of error recovery procedures), such that when such a failure due to working with the actual hardware occurs, the Hypervisor can do any of the things described above, for example, restart the Primary OS, upgrade a Guest OS to the status of a Primary OS, activate a reserve Primary OS, etc. The most frequent situation then Primary OS became unstable and crashes. The Hypervisor could detect such situation and reboot the Primary OS, since the crash of the Primary OS inside VM cannot damage the Hypervisor.

It should be understood that although the Guest OS can work with virtualized devices (for example, virtual hard drives, virtual network cards, etc.), at some point, the attempt by the Guest OS to access a virtual device needs to be translated into some operation on the real hardware. For example, if the Guest OS were working with a virtual hard drive, and try to write a file to that virtual hard drive, the Hypervisor would intercept that attempt, and can give the Primary OS the responsibility for writing an actual file to an actual, real hard drive.

The Hypervisor can take advantage of hardware support for virtualization, if available on the processor. For example, current Intel processors have VT technology that provides hardware based support for virtualization. Similarly, AMD Pacifica has new guest mode, and other processors have similar schemes. Where appropriate, the Hypervisor will reserve these highest privileged modes for itself, and give lesser privileges for accessing devices to the Primary OS, and possibly even lesser privileges than that to the Guest OSs.

As yet another option, the Hypervisor can perform a complete reinstallation of the Primary OS into the Primary VM, although this approach can be time consuming, and is generally viewed as less desirable. Optionally, the Hypervisor can periodically checkpoint the state of the Primary OS, and revert to appropriate checkpoint in case the Primary OS crashes, thereby resuming from the checkpoint or backup.

As yet a further alternative, the Hypervisor can launch several Primary operating systems, such that each of the Primary operating systems is only allowed direct access to one particular hardware device, but no others (the others are virtualized). For example, one Primary OS can manage the disk drive, another Primary OS can manage the network card, a third Primary OS can manage the Wi-Fi card, etc. This is shown in FIG. 12. This results in a more stable configuration, since a failure of the Primary OS that manages the network interface card (NIC) only means that the computer is no longer talking to the network, but the remainder of the functions are still operational. This means that the task of the Hypervisor, when recovering from a failure of some hardware device, is much easier—it only needs to recover, or restart operation of one device, such as the hard disk drive or the network card, etc.—rather than having to fully recover and restart operation of all the devices.

As a further extension of the idea of dedicating a particular Primary OS to managing a single resource (or some subset of resources), the concept can be applied to an environment with multiple computers, for example, a computer cluster, a server farm, etc. This is shown in FIG. 13. Such a cluster has a number of hardware nodes, each having a Hypervisor In that context, the resources at issue belong not to a single computer or server, but to the entire entity that to the outside world act as a single server, but is in fact made up of multiple computers. In this case, one of the Primary OSs can be responsible for managing storage, another of the Primary OSs can manage network interface, etc. The Hypervisor, as shown in FIG. 14 and FIG. 15, upon sensing that a particular Primary OS is being overloaded, for example, with disk access requests, can address the situation by redirecting other functions of that Primary OS (for example network interface functions) to a different physical machine of the same cluster. This gives the Hypervisor a high-level ability to manage load among the various elements of the cluster.

One of the advantages of the present architecture is that it does not require a specially developed or otherwise modified service operating system. As noted above, as the primary operating system, any standard operating system can be used, such as Windows, LINUX, etc. The VM is installed for each particular Primary OS as an ordinary application installation.

The Primary OS is launched within the primary VM, and does not need a special interface to the Hypervisor. The Hypervisor interacts with the Primary OS with the help of a user application and/or a user driver, which are installed in the Primary OS. The Primary OSs access to resources for which it does not have a sufficient privilege level is blocked and is instead virtualized by the VMM, which services the primary VM. As noted above, there are a number of mechanisms for translating the Primary OS to within the Primary VM, and back.

FIG. 16 illustrates the process of launching the Hypervisor according to one embodiment of the invention. As shown in FIG. 16, a Virtual Machine is first launched in step 1602. In step 1604, the Hypervisor is then launched on the system level. The Hypervisor checks whether real hardware and emulated hardware is the same (step 1606). This may be necessary for specifying the requirements of the hardware set of Virtual Machine. Another possibility is to provide emulated hardware access (i.e., to check that corresponding drivers and emulation procedures and so on are available). The Hypervisor then checks whether the real hardware can be replaced with emulated hardware without an OS restart (step 1608). If it is, then the Primary OS can be started inside a Virtual Machine without restarting the computer (step 1616), and the state of the system will now reflect the Primary OS running inside the Primary VM, having less than total privileges.

If real hardware cannot be replaced with emulated hardware without an OS restart in step 1608, then the Hypervisor checks whether the real hardware can be replaced with emulated hardware without an OS reinstall (step 1610). If yes, then, in step 1618, the Primary OS can be started in a VM, and then proceed to step 1614. If not, then, in step 1612, the Primary OS is reinstalled inside the VM, and the process proceeds to step 1614.

The Primary OS can be specially adapted for more effective work with the Hypervisor, but this is not necessary. The Primary OS can also work on its own, without the Hypervisor. Note also that the Hypervisor can itself be activated or deactivated at any time—therefore, the supervision by the Hypervisor of the Primary OS can be turned off and on dynamically. Here, activation of the Hypervisor means transfer of the Primary OS from the host PC into the VM. Deactivation of Hypervisor means transferring the Primary OS back from inside the VM to the host PC, and resuming its execution with full privileges.

The overall architecture thus can have a number of components—VMs running Guest OS's, VMM (or several VMMs), Primary VM running a Primary OS, and the Hypervisor. The Hypervisor is therefore a layer between the physical resources of the host PC and the various Virtual Machine components. The Hypervisor's primary tasks are as follows:
control over the physical resources of the host PC;
defining the access policy of the other components to the physical resources of the host PC;
dedicating certain resources of the host PC for exclusive use by some of the Virtual Machines, and other resources for shared use by several Virtual Machines;
providing a high level interface access (API) to the physical resources of the host PC.

The Hypervisor controls all host PC resources in the sense of scheduling and granting other components access to these resources. No other component of the system can establish access to a device without Hypervisor. At the same time Hypervisor can restrict access to some resources for all other components and itself manage some resource, via its own drivers. The Hypervisor provides APIs to shareable resources managed by itself for other components (VMMs and Guest/Primary OSs). Some resources can be managed by Primary OS via its drivers. Special application and/or driver installed into Primary OS and provide API to resources for other components—directly to VMMs/Guest OSs or indirectly via Hypervisor API.

The VMM represents a virtualized environment for execution of the Primary OS and the Guest OSs. The VMM uses a high level interface (API), provided by the Hypervisor, for interacting with physical resources of the host PC, and the Hypervisor allocates these resources between the various VMMs.

Thus, while the Hypervisor is responsible for control over the physical resources and control of access to them, the VMM is responsible for virtualization and/or emulation of these resources for the Guest OS, and optionally for the Primary OS. It is also possible to combine the Hypervisor and the VMM into a single module. Although it is believed that the separation into different components, as described above, is preferred, at least from a development perspective and a security perspective. The Hypervisor therefore controls three types of resources—non-sharable resources, which are given for exclusive use to one or more Guest operating systems, sharable resources managed by the Primary OS (via its drivers) and sharable resources managed by Hypervisor (via Hypervisor drivers). The Hypervisor can grant direct access to these resources for the corresponding VMMs.

Sharable resources, which are normally managed by the Hypervisor itself. The Hypervisor provides a high level interface to the Guest OSs VMMs and Primary OS VMM for accessing these resources.

Sharable resources are typically managed by the Primary OS. The Hypervisor sets up direct access to these resources for the Primary OS's VMM. The Primary OS's via installed applications and/or drivers provides a high level interface for the Hypervisor or directly to Guest OSs VMMs to access these resources. In another embodiment, the Hypervisor, retranslates the interface for Guest OSs VMMs that do not have direct API to Primary OS. The third type of resources is non-sharable resources exclusively given to particular Guest OS.

Depending on the implementation, the physical resources of the host PC can be split up in various ways between these three types of resources. Also, some of these types may not be present in some systems, depending on how the Hypervisor configures the system. Preferably, the Hypervisor should directly control the devices that are the fastest, better standardized and the simplest to manage, such as IDE/SCSI controllers, network cards, video cards, etc., and delegate to the Primary OS management of devices that are slower, and require relatively complex drivers.

The Hypervisor therefore provides a common interface for accessing all shared resources the particular component that uses that interface to access the resources is normally not aware of who, in reality, manages these resources—the Hypervisor or the Primary OS. In alternative embodiments, the Primary OS can provide the APIs directly to Guest OSs' VMMs without retranslation through Hypervisor. This could offer better performance in a trade off of isolation vs. security.

To manage access of other components to the physical resources of the host PC, the Hypervisor can use the various resources provided by the specific processors hardware architecture. For example, for the Intel VT technology, the VMCS setting can be used. For AMD Pacifica, VMCB (Virtual Machine control block) can be used. For IA-32/32e processors, the Hypervisor can use protection rings (0, 1, 2, 3) for code and data segments, paging protection mechanism (bits US, RW, NX), various settings of the IOPL, IDT, GDT/LDT, PDE/PTE, CRXX, etc.

FIG. 17 illustrates the situation where the Primary OS has crashed, and one of the Guest OS's needs to be upgraded to become the Primary OS. The process of recovery is illustrated in FIG. 18. As shown in FIG. 18, once the Hypervisor detects that recovery from a crashed Primary OS is necessary (step 1802), it revokes access to the hardware resources that the Primary OS had (step 1804). It also deactivates the Primary OS's interface for other components to shareable resources managed by the Primary OS (step 1806). If a Guest OS that needs to be "upgraded" is not yet running (step 1810), then the Hypervisor starts the recovery Guest OS (step 1812). If it is already running, then the resource access is granted to that Guest OS (step 1814). The interface is then activated in the Guest OS (step 1816), and, at this point, the Guest OS is now the new Primary OS (step 1818). The crash recovery is now finished (step 1820).

Thus, there are at least three different ways to recover from a Primary OS crash: activating an inactive reserved (but running) Primary OS, launching new instance of Primary OS and upgrading running Guest OS to Primary OS.

FIG. 19 illustrates the process of migration of one of the operating systems to another machine or to another VM, for example, in a cluster context. A new Guest OS/Primary OS is started (step 1902). The Hypervisor then waits for some event to occur, such as a lack of resources, hardware problems on the particular node, overloading, or an administrator's command (step 1904). If migration is needed (step 1906), then the Hypervisor checks whether the migration will depend on real hardware (i.e., whether the OS being migrated is a Primary OS, which deals with real resources, or a Guest OS, which deals with emulated resources) (step 1908). If the OS is a Guest OS, then it will be migrated into an essentially identical virtual environment, and no hardware changes will occur.

If the OS at issue is a Primary OS, then the Primary VM container can be different on the source host PC and on the destination host PC. For example, can be different in set of virtualized vs. non-virtualized hardware—for example, the source Primary VM could manage the real IDE, and the destination Primary VM can be managing emulated IDE (while the real IDE is managed by the Hypervisor). The real hardware on the source node can be different from real hardware on the destination node (e.g., different network card vendors, different network card models, etc., for example). During this migration, the Primary OS could face changes in hardware and can experience the same problem as during initial transfer from the host PC into the Primary VM (step 1910).

If not, then a new hardware node (i.e., a free node) is chosen (step 1912), and step 1910 is skipped.

Released hardware resources are then redistributed (step 1914), and the state of the transferred VM is saved and transferred to the new hardware node (step 1916). Now that the state of the OS is fully virtualized it could be migrated to the new hardware node.

One application of the approach described above is in programming the CPU's timer, for example, based on <real timer frequency>=1/[(1/<VM 1 timer frequency>)+ . . . +(1/<VM N timer frequency>)]

Other, more complex formulas, can also be used. Thus, each Guest OS can directly use the timer interrupts.

One of the advantages of the proposed architecture is a partial isolation of the Primary OS from other components of the system, and from some of the physical resources of the system. Therefore, any problems encountered by the Primary OS, and even its complete failure, will not result in a total failure of the entire host PC. The most serious consequence of a crash of the Primary OS can be only temporary an inability to access those physical hardware components that the Primary OS, at the time of the crash, had a sufficient privilege level to manage.

To optimize the speed of access by the Guest OS's to the physical resources of the computer, including those that are managed by the Primary OS, it is also possible to provide for direct access to these resources, bypassing the Hypervisor. In this case, the Hypervisor provides not the I/O interface itself, but an interface for establishing the direct access channel between the Guest OS and the Primary OS.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computing cloud comprising:
   at least one computing node having a Virtual Machine (VM) running on a non-privileged level; and
   a plurality of additional computing nodes, each node having a Hypervisor with the highest privilege level, and a Virtual Machine Monitor (VMM) running with no higher privilege level than the Hypervisor, and Virtual Machines (VMs) running on a non-privileged level; and
   each node having a Primary operating system (POS) running within the corresponding VM; and
   each POS having direct access to hardware device of the corresponding computing node; and
   the VMs of the corresponding node using the POS of its node to access the hardware devices.

2. The computing cloud of claim 1, wherein the POS is migratable from one node to another node in online or offline mode.

3. The computing cloud of claim 1, wherein the VMs are migratable from one node to another node.

4. The computing cloud of claim 3, wherein POS or its VM can migrate on-the-fly after system failure or overload.

5. The computing cloud of claim 1, wherein secure isolation enables any VM to communicate with the POS via intermediation dedicated code rerouting messages between processes so that VM processes are not aware of POS processes.

6. The computing cloud of claim 5, wherein a POS that becomes unsecure is terminated and a new POS is launched in the computing cluster.

7. The computing cloud of claim 1, wherein the hardware device is any of a mass storage device, a hardware interface device, a video device subsystem and a human interface device.

8. The computing cloud of claim 1, wherein the cloud is a server farm.

9. The computing cloud of claim 1, wherein application memory area of at least one VM is protected from accessing by the hardware resources; and
   the applications are trusted applications that cannot be observed or modified by other software of the computing cloud.

10. The cloud of claim 1, further comprising a secure boot manager for starting a secure VM using trusted hypervisor.

11. The computing cloud of claim 1, further comprising means for migrating the POS from a node with a trusted hypervisor to another node with trusted hypervisor.

12. The computing cloud of claim 1, further comprising at least one node with a trusted component.

13. The computing cloud of claim 12, wherein the trusted component is a driver or the hypervisor.

14. A method of operating a computing cloud comprising:
    initializing at least one computing node having a Virtual Machine (VM) running on a non-privileged level; and
    initializing a plurality of additional computing nodes, each node having a Hypervisor with the highest privilege level, and a Virtual Machine Monitor (VMM) running with no higher privilege level than the Hypervisor, and Virtual Machines (VMs) running on a non-privileged level; and
    launching Primary operating system (POS) on each node and running within the corresponding VM, each POS having direct access to hardware device of the corresponding computing node; and
    the VMs of the corresponding node using the POS to access the hardware device.

15. The method of claim 14, further comprising migrating the POS from one node to another node, the migrating comprising:
    stopping Primary OS execution;
    saving Primary OS CPU context;
    saving contents of Primary OS memory;
    creating a Primary VM on the another node;
    granting the Primary VM access to some host PC devices;

loading saved Primary OS CPU context into a virtual CPU;
loading saved Primary OS memory into a VM;
resuming Primary OS execution inside Primary VM.

16. The method of claim 15, further comprising updating a configuration the POS to conform to hardware changes after migration.

17. The method of claim 14, further comprising migrating the POS from one node to another node, the migrating comprising:
  installing a boot manager component of the Hypervisor restarting the POS;
  during host boot, having the Hypervisor take control before the Primary OS;
  creating a Primary VM;
  granting the Primary VM access to some host node devices;
  starting the Primary OS booting process inside the Primary VM under control of Hypervisor; and
  resuming Primary OS execution inside the Primary VM.

18. The method of claim 17, further comprising updating a configuration the POS to conform to hardware changes after migration.

19. The method of claim 14, further comprising migrating the POS from one node to another node, the migrating comprising:
  installing a boot manager component of the Hypervisor;
  restarting the Primary OS;
  during host boot, having the Hypervisor take control before the Primary OS;
  creating the Primary VM;
  granting the Primary VM access to some host node devices;
  initiating Primary OS installation process inside the Primary VM; and
  resuming Primary OS execution inside the Primary VM.

20. The method of claim 19, further comprising updating a configuration the POS to conform to hardware changes after migration.

* * * * *